(12) United States Patent
Kim et al.

(10) Patent No.: US 11,277,295 B2
(45) Date of Patent: *Mar. 15, 2022

(54) METHOD AND APPARATUS FOR PROCESSING DELAYED SIDELINK SIGNAL

(71) Applicant: LG ELECTRONICS INC., Seoul (KR)

(72) Inventors: Heejin Kim, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 69 days.

This patent is subject to a terminal disclaimer.

(21) Appl. No.: 16/762,902

(22) PCT Filed: Nov. 9, 2018

(86) PCT No.: PCT/KR2018/013604
§ 371 (c)(1),
(2) Date: May 8, 2020

(87) PCT Pub. No.: WO2019/093810
PCT Pub. Date: May 16, 2019

(65) Prior Publication Data
US 2020/0267041 A1 Aug. 20, 2020

Related U.S. Application Data

(60) Provisional application No. 62/584,599, filed on Nov. 10, 2017.

(30) Foreign Application Priority Data

Sep. 14, 2018 (KR) .......................... 10-2018-0110517
Nov. 2, 2018 (KR) .......................... 10-2018-0133319

(51) Int. Cl.
*H04L 12/50* (2006.01)
*H04L 27/26* (2006.01)
(Continued)

(52) U.S. Cl.
CPC ..... *H04L 27/2665* (2013.01); *H04W 56/0015* (2013.01); *H04W 92/18* (2013.01)

(58) Field of Classification Search
None
See application file for complete search history.

(56) References Cited

U.S. PATENT DOCUMENTS

2014/0293968 A1 10/2014 Mahalleh et al.
2015/0289219 A1* 10/2015 Kim .................. H04W 56/0005
370/350

(Continued)

FOREIGN PATENT DOCUMENTS

KR 101784979 10/2017
WO 2015/006426 1/2015

OTHER PUBLICATIONS

PCT International Application No. PCT/KR2018/013604, International Search Report dated Feb. 15, 2019, 2 pages.

*Primary Examiner* — Gerald A Smarth
(74) *Attorney, Agent, or Firm* — Lee Hong Degerman Kang & Waimey

(57) ABSTRACT

An example of the present specification proposes a technique for decoding a plurality of wireless signals having different characteristics. For example, the plurality of wireless signals may have different CP lengths, be received in different frequency bands, or be configured by different channels. An example of the present specification proposes an example of performing of decoding by using a plurality of reception windows on the basis of a specific wireless signal. Another example of the present specification pro- (Continued)

poses an example of a proposal of feedback information to a transmission UE on the basis of a specific wireless signal.

16 Claims, 21 Drawing Sheets

(51) Int. Cl.
*H04W 56/00* (2009.01)
*H04W 92/18* (2009.01)

(56) References Cited

U.S. PATENT DOCUMENTS

| | | |
|---|---|---|
| 2016/0044666 A1 | 2/2016 | Shin et al. |
| 2016/0302246 A1 | 10/2016 | Chervyakov et al. |
| 2017/0079026 A1* | 3/2017 | Li .................. H04L 5/0091 |
| 2017/0187558 A1* | 6/2017 | Yasukawa ........ H04L 27/2607 |
| 2017/0188306 A1* | 6/2017 | Park ................ H04L 5/0055 |
| 2018/0160405 A1* | 6/2018 | Akkarakaran .... H04W 72/1289 |
| 2019/0141755 A1* | 5/2019 | Bai ................. H04W 24/02 |

* cited by examiner

FIG. 8
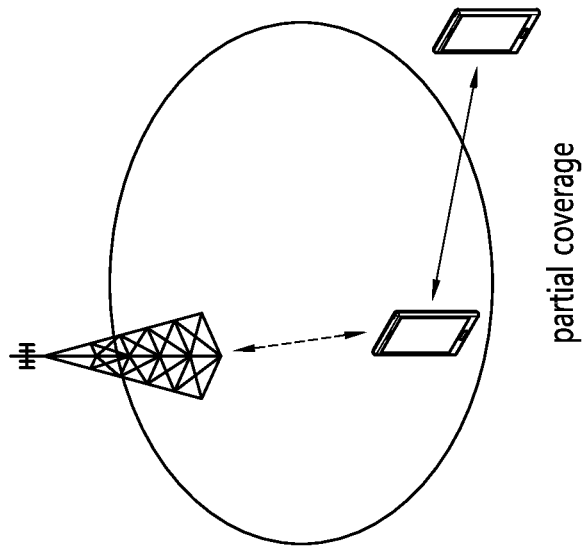
partial coverage
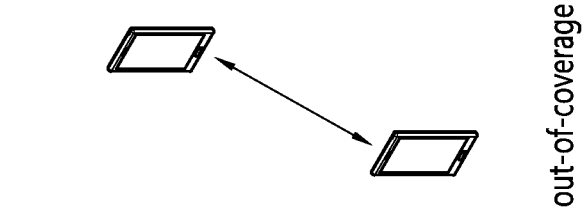
out-of-coverage
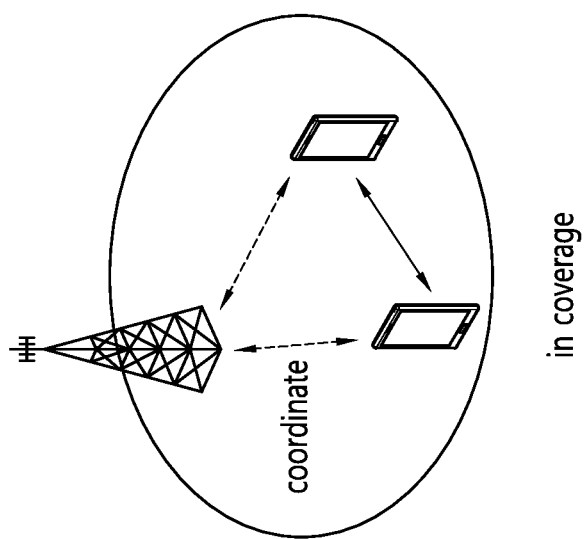
in coverage

METHOD AND APPARATUS FOR PROCESSING DELAYED SIDELINK SIGNAL

CROSS-REFERENCE TO RELATED APPLICATIONS

This application is the National Stage filing under 35 U.S.C. 371 of International Application No. PCT/KR2018/013604, filed on Nov. 9, 2018, which claims the benefit of U.S. Provisional Application No. 62/584,599, filed on Nov. 10, 2017, and also claims the benefit of earlier filing date and right of priority to Korean Application Nos. 10-2018-0110517, filed on Sep. 14, 2018, and 10-2018-0133319, filed on Nov. 2, 2018, the contents of which are all hereby incorporated by reference herein in their entirety.

BACKGROUND

Technical Field

The present disclosure relates to a wireless communication system supporting a sidelink, and more specifically, to propose a method and apparatus for an improved communication technique for processing a wireless signal used on the sidelink when the wireless signal is delayed.

Related Art

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims to support an Internet protocol (IP)-based multimedia service with a data transfer rate of 1 Gbps in a stationary or slowly moving state or 100 Mbps in a fast moving state.

$3^{rd}$ generation partnership project (3GPP) is a system standard satisfying requirements of the IMT-advanced, and prepares LTE-advanced which is an improved version of long term evolution (LTE) based on orthogonal frequency division multiple access (OFDMA)/single carrier-frequency division multiple access (SC-FDMA) transmission. The LTE-advanced (LTE-A) is one of promising candidates for the IMT-advanced.

Meanwhile, recently, there is a growing increase in a sidelink or device-to-device (D2D) technique for performing direct communication between devices. In particular, the sidelink or D2D is drawing attention as a communication technique for a public safety network. Although a commercial communication network is rapidly changing to LTE, the public safety network is primarily based on a 2G technique at present in terms of costs and a problem of a collision with the conventional communication protocol. Such a technical gap and a demand on an improved service results in an effort of improving the public safety network.

The public safety network has a higher service requirement (reliability and safety) in comparison with the commercial communication network, and in particular, even if cellular communication is performed in an out-of-coverage state or is not available, also demands direct signal transmission/reception between devices, i.e., a sidelink (or D2D) operation.

The sidelink (or D2D) operation may have various advantages in a sense that it is signal transmission/reception between proximate devices. For example, a D2D user equipment (UE) may perform data communication with a high transfer rate and a low delay. Further, the D2D operation may distribute traffic concentrated on a base station, and may have a role of extending coverage of the base station if the D2D UE plays a role of a relay.

The aforementioned sidelink (or D2D) communication may be extended to apply to signal transmission/reception between vehicles, and communication related to the vehicle is particularly called vehicle-to-everything (V2X) communication.

In the V2X, the term 'X' may be a pedestrian, a vehicle, or an infrastructure/network, which may be indicated respectively by V2P, V2V, or V2I/N.

SUMMARY

When a receiving UE receives a wireless signal through a sidelink, various problems may occur when decoding is performed using a related art receiver window. For example, if there is one transmitting UE and a size of propagation delay due to a distance between the transmitting UE and the receiving UE is greater than a length of a cyclic prefix (CP) applied/included in the received wireless signal, various problems may occur. For example, if there is one transmitting UE/receiving UE and the size of propagation delay is greater than the length of the CP, decoding may be difficult if a single receiver window is used without improving a start time of the receiver window. Accordingly, an example of the present specification, which will be described later, may improve decoding performance by efficiently determining a start time of a receiver window or efficiently determining the number of receiver windows.

In addition, even when the receiving UE receives a plurality of wireless signals having different characteristics (e.g., different neurology, subcarrier spacing, CP length, length of time unit, and/or frequency band as described in an example of the present specification described later), there may be a problem for the receiving UE to decode all signals using the receiver window according to the related art. For example, since different delays or errors occur for a plurality of wireless signals, the receiving UE cannot normally perform decoding according to the related art technique. Further, even if the same delay or error occurs for a plurality of wireless signals, the receiving UE cannot normally perform decoding because characteristics of the plurality of wireless signals are different from each other.

An example of the present specification proposes a technique for decoding a plurality of wireless signals having different characteristics. For example, a plurality of wireless signals may have different CP lengths, may be received in different frequency bands, or may have different channels. An example of the present specification proposes an example of performing decoding using a plurality of receiver windows based on a specific wireless signal.

The method according to an example of the present specification relates to a method for a receiving terminal that receives a signal through a sidelink. For example, the receiving terminal may acquire synchronization for the sidelink. Thereafter, the receiving terminal receives a first wireless signal and a second wireless signal through a sidelink, and the first wireless signal may include a first cyclic prefix (CP) and the second wireless signal may include a second CP. In addition, in order to decode the first wireless signal and the second wireless signal, the receiving terminal may set a plurality of receiver windows, and here, start times of the plurality of receiver windows may be set to be different. Also, the receiving terminal may decode the first wireless signal and the second wireless signal based on the plurality of receiver windows.

An example of the present specification proposes a method of configuring a plurality of receiver windows based on a wireless signal in which a length of a CP is short among a plurality of wireless signals. Through this, normal decoding may be performed although the length of the CP is set to be short set in a high-band signal.

BRIEF DESCRIPTION OF THE DRAWINGS

FIG. 8 is a view showing an example of a scenario to which a sidelink is applied.

DESCRIPTION OF EXEMPLARY EMBODIMENTS

Technical features described below may be used in a communication standard by the $3^{rd}$ generation partnership project (3GPP) standardization organization or a communication standard by the institute of electrical and electronics engineers (IEEE) standardization organization. For example, the communication standard by the 3GPP standard organization includes long term evolution (LTE) and/or an evolution of an LTE system. The evolution of the LTE system include LTE-advanced (LTE-A), LTE-A Pro, and/or a 5G new radio (NR). The communication standard by the IEEE standard organization includes a wireless local area network (LAN) system such as IEEE 802.11a/b/g/b/ac/ax or the like. The aforementioned system uses various multiple access techniques such as orthogonal frequency division multiple access (OFDMA) and/or single carrier-frequency division multiple access (SC-FDMA) or the like in uplink and/or downlink. For example, only the OFDMA may be used in downlink and only the SC-FDMA may be used in uplink, or the OFDMA and the SC-FDMA may be used together in downlink and/or uplink.

Figure 1:
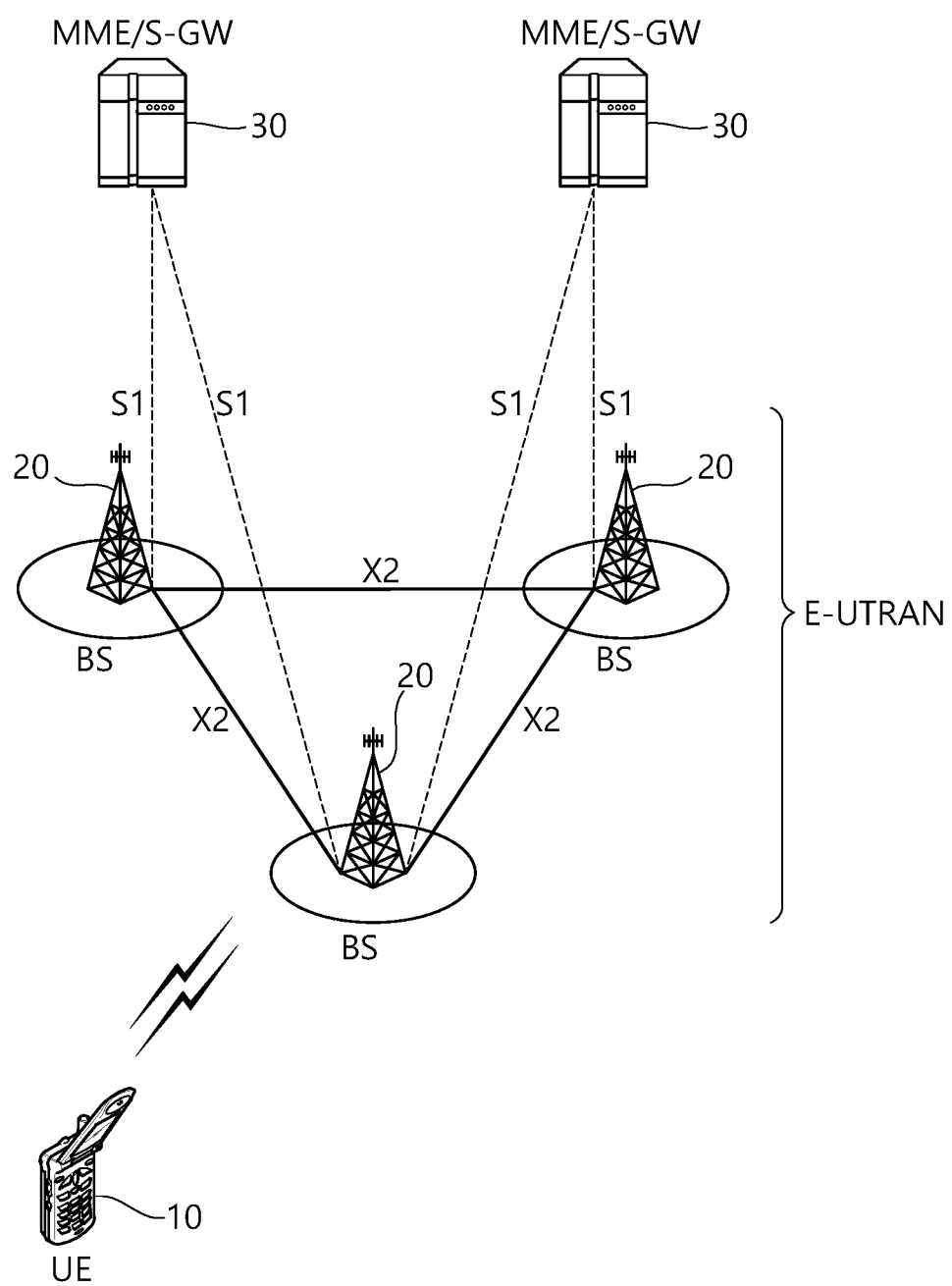
FIG. 1 shows an example of a wireless communication system to which the technical features of the present specification may be applied.

FIG. 1 shows an example of a wireless communication system to which a technical feature of the present specification is applicable. Specifically, FIG. 1 is an example based on an evolved-universal terrestrial radio access network (E-UTRAN). The aforementioned LTE is part of evolved-UMTS (E-UMTS) using the E-UTRAN.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Figure 2:
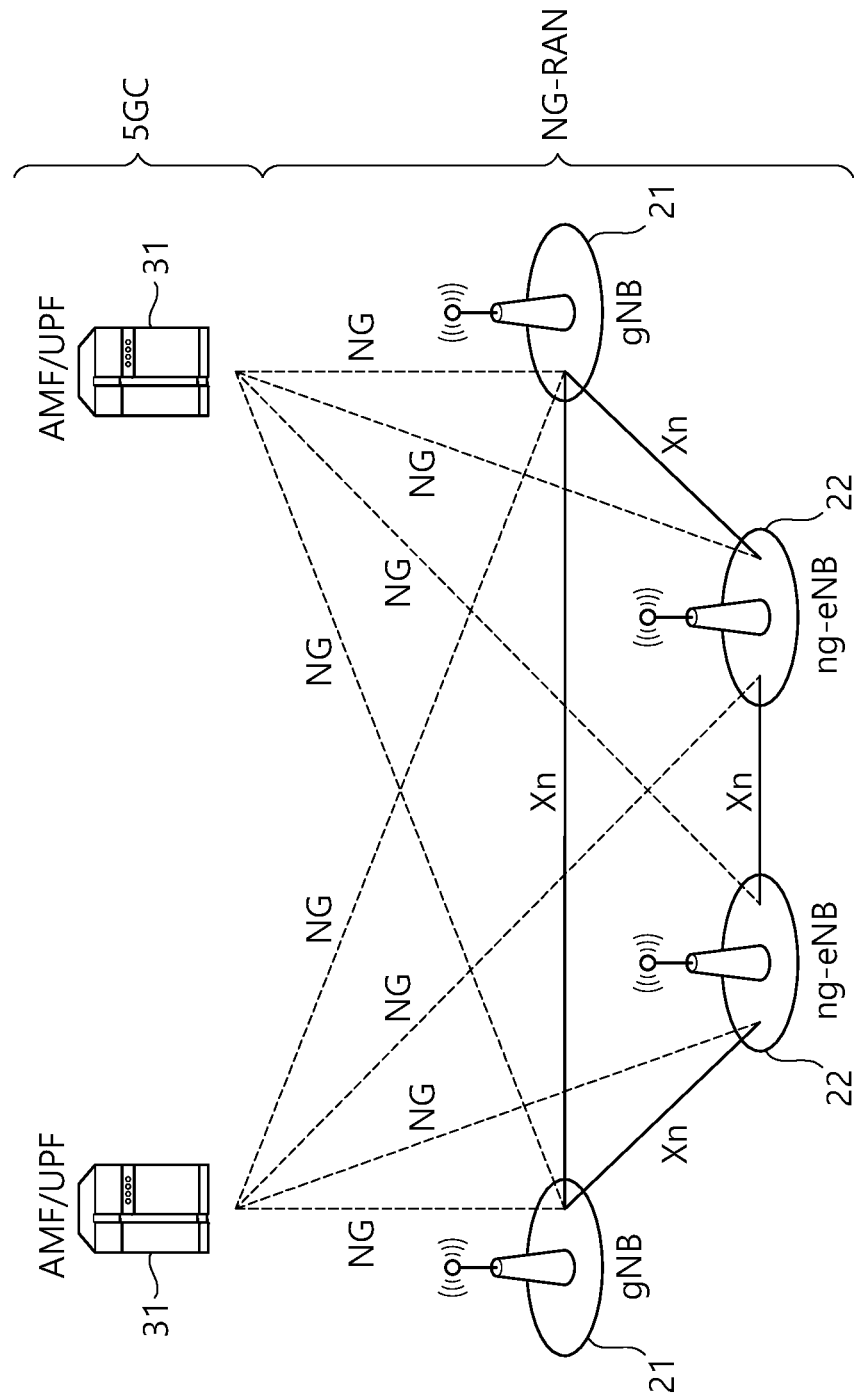
FIG. 2 shows another example of a wireless communication system to which the technical features of the present specification may be applied.

FIG. 2 shows another example of a wireless communication system to which a technical feature of the present specification is applicable. Specifically, FIG. 2 is an example in which a 5G new radio (NR) standard is utilized. A communication entity used in the 5G NR standard (hereinafter, "NR" standard) incorporates all or some functions of the entity (eNB, MME, S-GW) introduced in FIG. 1, and may be identified as a name "NG" or "ng" so as to be distinguished from the conventional standard.

The system of FIG. 2 includes a next generation-radio access network (NG-RAN) communicating with a user equipment (UE). NG-RANs 21 and 22 are entities corresponding to a BS, and include a gNB 21 or an ng-eNB 22. A network interface called an Xn interface is defined between the NG-RANs 21 and 22. The gNB 21 provides an NR user plane and control plane for the UE, and is connected to a 5G core network (5 GC) via the NG interface of FIG. 2. The Ng-eNB 22 is an entity for providing a user plane and control plane based on evolved-universal terrestrial radio access (UTRA), and is connected to the 5GC via the NG interface.

An access and mobility management function (AMF) is an entity including a function of the conventional MME, and communicates with the NG-RANs 21 and 22 via an NG-C interface. The NG-C interface is a control plane interface between the NG-RAN and the AMF.

A user plane function (UPF) is an entity including a function of the conventional S-GW, and communicates with the NG-RANs 21 and 22 via an NG-U interface. The NG-U interface is a user plane interface between the NG-RAN and the AMF.

On the system of FIG. 1 and/or FIG. 2, layers of a radio interface protocol between the network (NG-RAN and/or E-UTRAN) and the UE may be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and a BS.

Hereinafter, a structure of a radio frame transmitted/received through a physical channel will be described.

In the LTE standard (and the evolution of the LTE standard), one radio frame consists of 10 subframes in a time domain, and one subframe consists of 2 slots in the time domain. One subframe may have a length of 1 millisecond (ms), and one slot may have a length of 0.5 ms. A time for transmitting one subframe is defined as a transmission time interval (TTI). The TTI may be a minimum unit of scheduling.

Unlike the LTE standard, the NR standard supports various numerologies, and thus a radio frame is configured in various structures. In the NR standard, a plurality of subcarrier spacings are supported on a frequency domain. A numerology of the NR is determined by a numerology in use. The plurality of numerologies supported in the NR are shown in Table 1 below. Each numerology is identified by an index "$\mu$".

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1, a subcarrier spacing may be determined as one of 15, 30, 60, 120, and 240 kHz. However, since a specific numeral value is changeable, each spacing (e.g., $\mu$=0, 1 ... 4) may be indicated by $1^{st}$ and $2^{nd}$ to $5^{th}$ subcarrier spacings (i.e., N subcarrier spacings). As shown in Table 1, it may not be used to transmit user data (e.g., physical uplink shared channel (PUSCH), physical downlink shared channel (PDSCH), etc.) based on a subcarrier spacing. That is, user data transmission may not be supported only in predetermined at least one subcarrier spacing (e.g., 240 kHz).

In addition, as shown in Table 1, a synchronization channel (e.g., primary synchronization signal (PSS), secondary synchronization signal (SSS), physical broadcast channel (PBCH), etc.) may not be supported based on the subcarrier spacing. That is, the synchronization channel may not be supported only in specific at least one subcarrier spacing (e.g., 60 kHz).

In the NR standard, the number of slots and the number of symbols to be included may be set differently based on various numerologies, i.e., various subcarrier spacings. A specific example thereof may be as shown in Table 2 below.

TABLE 2

| $\mu$ | The number of symbols in slot | The number of slots in radio frame | The number of slots in subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Based on Table 2, when a first numerology with "$\mu$=0" is applied, one radio frame includes 10 subframes, one subframe corresponds to 1 slot, and 1 slot includes 14 symbols. In the present specification, a 'symbol' means a signal transferred for a specific time duration, and for example, may mean a signal generated by orthogonal frequency division multiplexing (OFDM) processing. That is, a symbol of the present specification may mean an OFDM/OFDMA symbol or an SC-FDMA symbol or the like. A cyclic prefix (CP) may be located between the symbols. An example of Table 2 may be an example to be applied to a normal CP.

Figure 3:
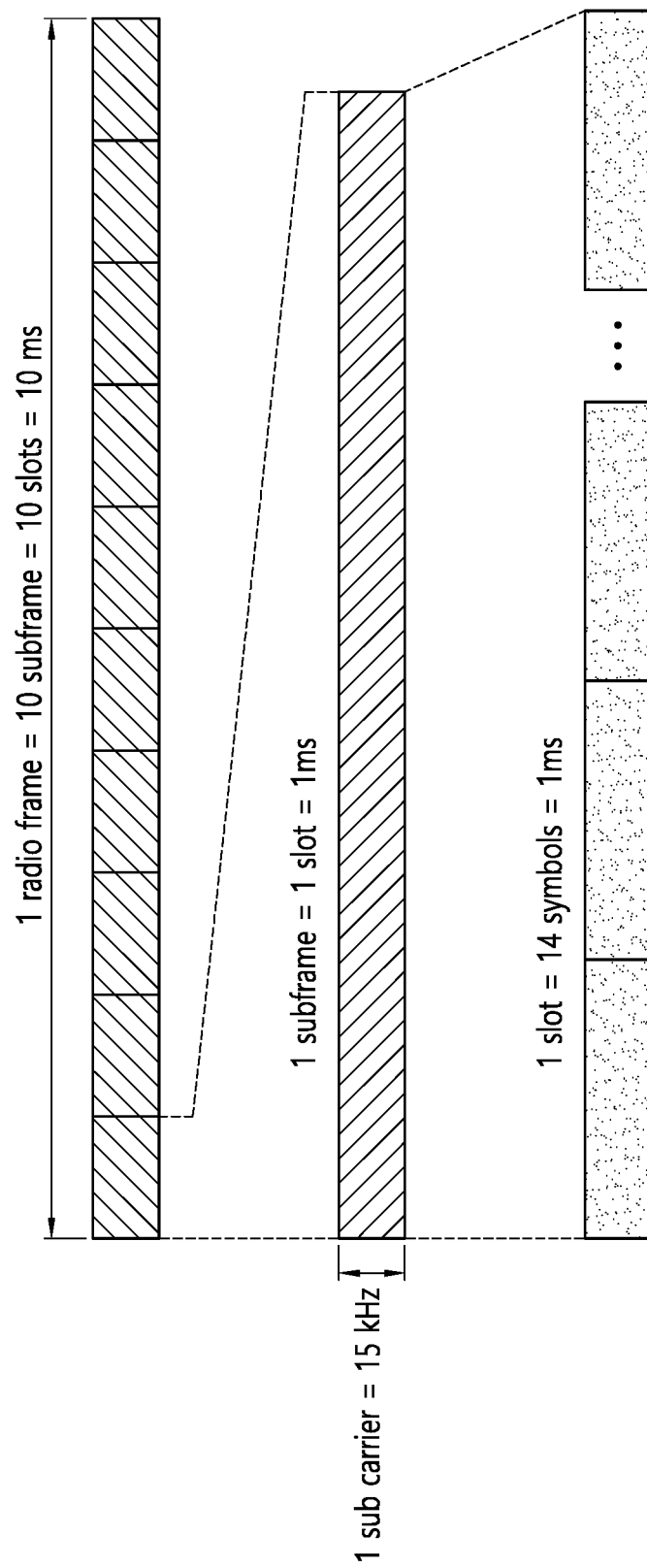
FIG. 3 shows an example in which a specific numerology is applied.

FIG. 3 shows an example to which a specific numerology is applied. That is, FIG. 3 shows a case of $\mu$=0.

Figure 4:
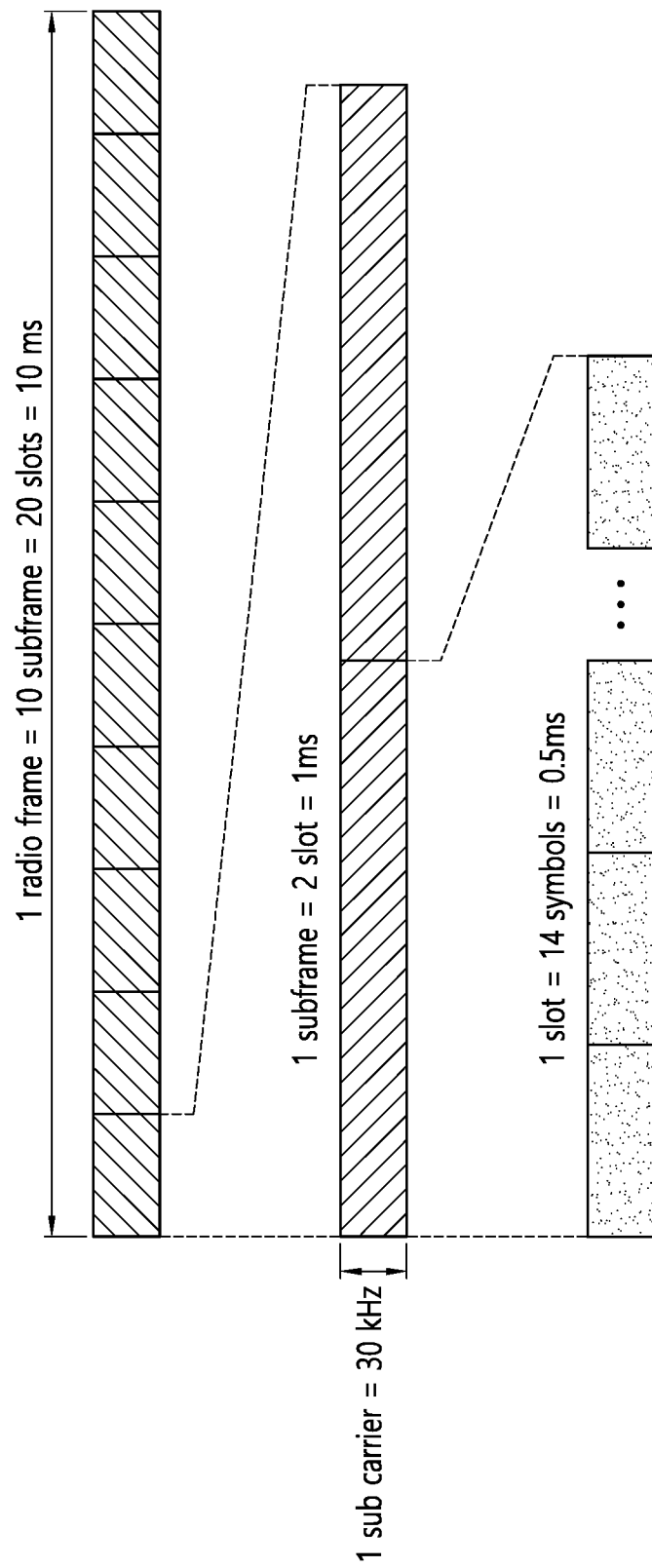
FIG. 4 shows an example in which another numerology is applied.

FIG. 4 shows an example to which another numerology is applied. That is, FIG. 4 shows a case of $\mu$=1.

Meanwhile, frequency division duplex (FDD) and/or time division duplex (TDD) may be applied in a wireless system to which an example of the present specification is applied. When TDD is applied, uplink and downlink subframes are allocated on a subframe basis in an LTE system.

In case of an NR standard/system, each symbol may be divided into downlink (indicated by D), flexible (indicated by X) and uplink (indicated by U). The content of the following table may be applied commonly to a specific cell, or may be applied commonly to adjacent cells, or may be applied individually or differently for each UE.

TABLE 3

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |

For convenience of explanation, Table 3 shows only part of a format (e.g., TDD format) defined in the actual NR standard. A specific allocation scheme may be changed or added. A UE may have a slot format (i.e., TDD format) configured through a higher layer signal, may have a slot format configured through downlink control information (DCI) transmitted through a physical downlink control channel (PDCCH), or may have a slot format configured through a combination of a higher layer signal (RRC signal) and DCI.

Figure 5:
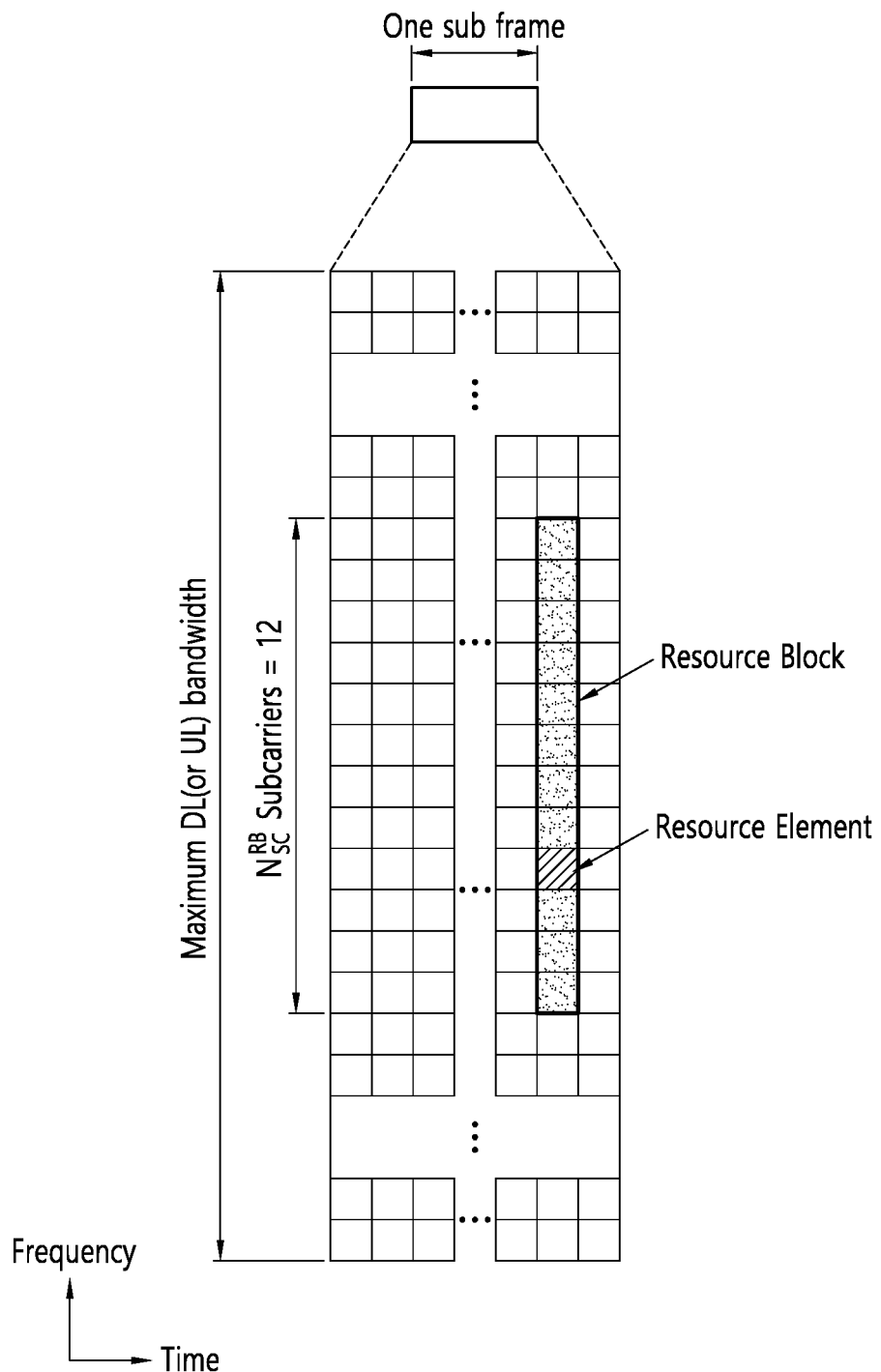
FIG. 5 is a diagram showing an example of a resource grid.

FIG. 5 is a drawing showing an example of a resource grid. The example of FIG. 5 is a time-frequency resource grid used in the NR standard. The example of FIG. 5 may be applied to uplink and/or downlink. As illustrated, a plurality of slots are included on a time axis in one subframe. Specifically, when expressed based on a value "$\mu$", "$14 \times 2^{\mu}$" symbols may be expressed in a resource grid. In addition, as illustrated, one resource block (RB) may occupy 12 contiguous subcarriers. One RB may be called a physical RB (PRB), and 12 resource elements (REs) may be included in each PRB. The number of RBs that may be allocated may be determined based on a minimum value and a maximum value. In addition, the number of RBs that may be allocated may be individually set based on a numerology "µ", and may be set to the same value or different values for uplink and downlink.

Hereinafter, a cell search scheme performed in the NR standard will be described. A UE may obtain a time and/or frequency synchronization with a cell, and may perform cell discovery to obtain a cell identifier (ID). A synchronization channel such as a primary synchronization signal (PSS), a secondary synchronization signal (SSS), a physical broadcast channel (PBCH), or the like may be used for the cell discovery.

Figure 6:
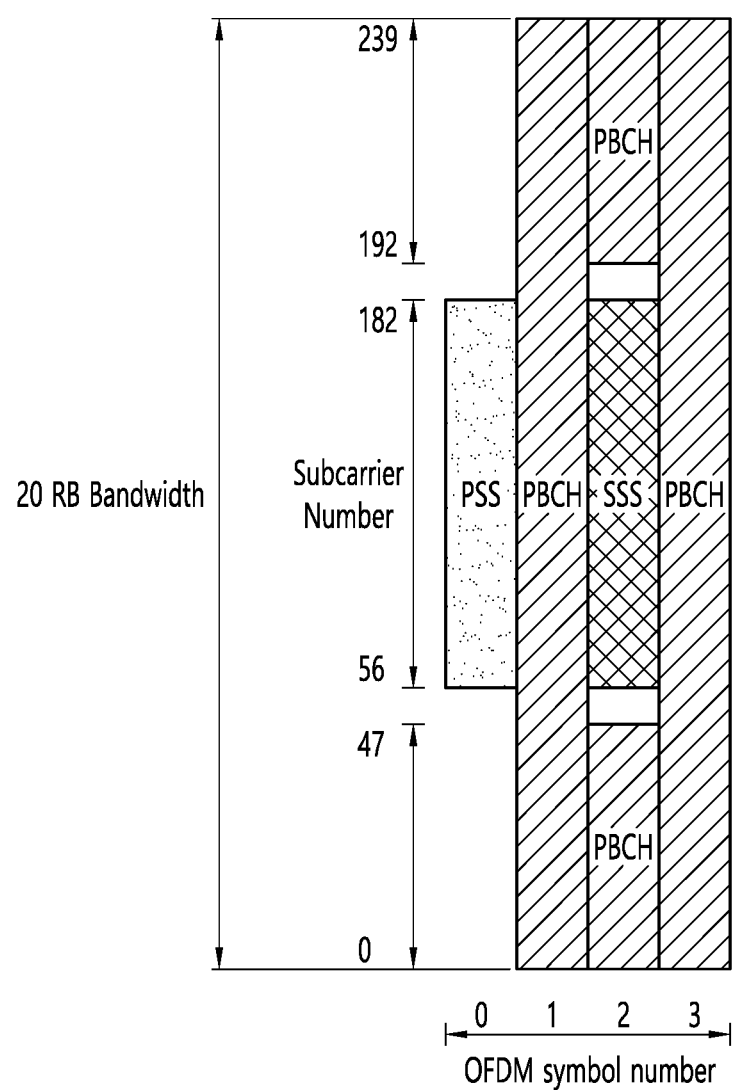
FIG. 6 shows an example of a synchronization channel applied to an example of the present specification.

FIG. 6 shows an example of a synchronization channel applied to an embodiment of the present specification. As illustrated, a PSS and an SSS may include one symbol and 127 subcarriers, and a PBCH may be transmitted through 3 symbols and may include 240 subcarriers.

The PSS is used to obtain synchronization signal/PBCH block (SSB) symbol timing, and indicates three hypotheses for identifying a cell ID. The SSS is used to identify the cell ID, and indicates 336 hypotheses. As a result, 1008 physical cell IDs may be configured through the PSS and the SSS.

The SSB block may be transmitted repeatedly based on a predetermined pattern within a 5 ms window. For example, when L SSB blocks are transmitted, all of SSB #1 to SSB #L include the same information, but may be transmitted through beams of different directions. That is, a quasi co-location (QCL) may not be applied for the SSB blocks within the 5 m window. A beam used to receive the SSB block may be used in a subsequent operation (e.g., a random access operation or the like) between a UE and a network. The SSB block may be repeated with a specific period. A repetition period may be determined individually based on a numerology.

As illustrated, the PBCH has a bandwidth of 20 RBs in $2^{nd}/4^{th}$ symbols, and has a bandwidth of 8 RBs in a $3^{rd}$ symbol. A DM-RS for decoding the PBCH is included in the PBCH. A frequency domain is determined in the DMRS based on a cell ID value. Unlike in the LTE standard, since a cell-specific RS (CRS) is not defined in NR, a specific DM-RS is defined for demodulation of the PBCH. A PBCH-DMRS may include information indicating an SSB index.

The PBCH performs various functions, and may perform a function of representatively broadcasting a master information block (MIB). By reference, system information (SI) is divided into minimum SI (MSI) and other SI (OSI). The minimum SI may be divided again into MIB and system information type1 (SIB1), and the remaining minimum SI except for the MIB may be called remaining minimum SI (RMSI).

The MIB includes information required to decode the SIB1. For example, the MIB includes the SIB1 (a message ⅔ used in the random access procedure, a subcarrier spacing applied to other system information (SI)), a frequency offset between the SSB and an RB transmitted later, a bandwidth of PDCCH/SIB, and information for decoding the PDCCH (e.g., information on search-space/CORESET/DM-RS or the like described below). The MIB may be transmitted periodically, and the same information may be transmitted repeatedly for a time duration of 80 ms. The SIB1 is transmitted repeatedly through the PDSCH, and includes control information for initial access of the UE and information for decoding a different SIB.

Hereinafter, a sidelink or D2D operation to which an example of the present specification is applied will be described.

Figure 7:
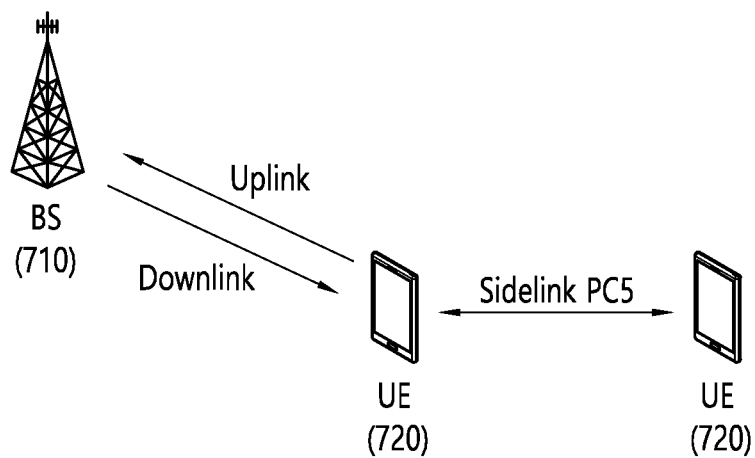
FIG. 7 is a diagram for a structure of a sidelink to which an example of the present specification is applied.

FIG. 7 is a drawing for a structure of sidelink to which an example of the present specification is applied. As illustrated, uplink (UL) and downlink (DL) may be defined between a BS 710 and a UE 720. In addition, sidelink (SL) is defined between the UEs 720. The SL corresponds to a PC5 interface defined on the 3GPP standard. For example, a resource allocated to the SL may be selected from UL resources. Specifically, a subframe (or a time resource such as a slot or the like) on a UL frequency through FDD or a subframe (or a time resource such as a slot or the like) allocated on UL through TDD may be allocated.

The term "ProSe communication" may be used in the same concept as the SL. In general, the ProSe means an end-to-end application. The SL may mean a channel structure. Specifically, a structure for a physical/transport/logical channel or the like used for an air-interface to realize the ProSe application is described in general in the concept as the SL.

FIG. 8 is a drawing showing an example of a scenario to which sidelink is applied. As illustrated, sidelink (SL) or Prose communication may be divided into three scenarios. First, in an in-coverage scenario, a network (e.g., BS) may allocate a specific resource for sidelink (or ProSe) to a transmitting UE, or may allocate a resource pool (RP) that may be used by the transmitting UE. Second, an out-of-coverage scenario is a case where a network-based control is impossible. The transmitting UE may perform SL communication through a predetermined resource (e.g., a resource predetermined through USIM or UICC card or the like). Even in case of an out-of-coverage scenario, it may be an in-coverage situation for normal cellular traffic, and there may be no coverage only for ProSe communication. Finally, in a partial coverage scenario, an in-coverage UE and an out-of-coverage UE co-exist. Specifically, the out-of-coverage UE may use a predetermined resource, and the in-coverage UE may perform communication through a resource controlled by the network.

Figure 9:
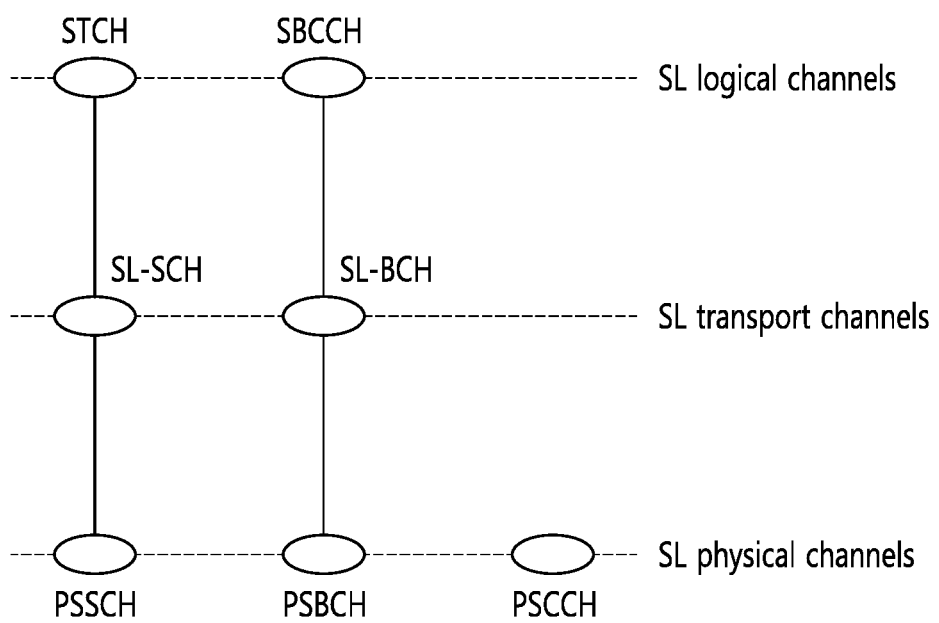
FIG. 9 is a view showing a mapping relationship between channels related to sidelinks.

FIG. 9 is a drawing showing a mapping relation between channels related to sidelink. A logical channel for the sidelink (SL) may be defined as an SL traffic channel (STCH) for a data path and an SL broadcast control channel (SBCCH) for control signaling. The STCH is used to transmit user information for a ProSe application, and is mapped to an SL shared channel (SL-SCH) and a physical DL shared channel (PSSCH). The SBCCH is used to transmit a control signal or the like for synchronization, and is mapped to an SL broadcast channel (SL-BCH) and a physical SL broadcast channel (PSBCH). A physical SL control channel (PSCCH) corresponds to a PDCCH of cellular communication. Specifically, the PSCCH is used to transmit sidelink control information (SCI) which is control information required to receive and demodulate the PSSCH. The SCI information is transmitted before an STCH data block is transmitted.

Figure 10:
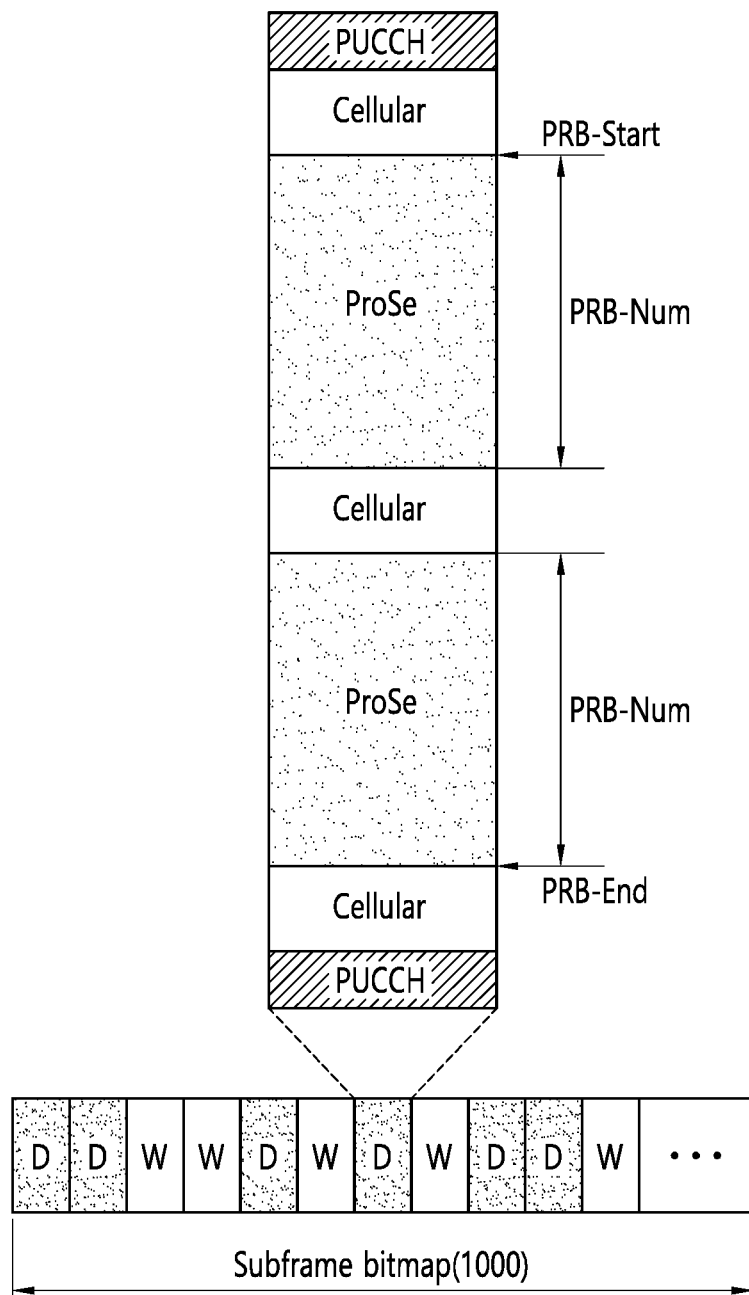
FIG. 10 shows an example of a resource pool for sidelink (SL) communication.

FIG. 10 shows an example of a resource pool for sidelink (SL) communication. The example of FIG. 10 shows an example in which a resource pool is configured on a subframe basis. However, the illustrated subframe may be replaced with another time unit (e.g., slot, symbol, or TTI). Based on the example of FIG. 10, whether a corresponding subframe is used for SL may be indicated depending on a subframe bitmap 1000. A pattern indicated depending on the subframe bitmap 1000 may be repeated.

Based on the example of FIG. 10, two frequency resources may be allocated for SL in one subframe, and each frequency resource may be indicated on a physical resource block (PRB) basis. Specifically, one frequency resource may start from PRB_start, and the other frequency resource may end at PRB_end. The number of PRBs occupied by each of the frequency resources may be PRB-Num. One UE is configured to use any one of a resource for sidelink/ProSe communication and a resource for cellular communication. A resource pool (RP) for SL communication may be divided into RX RP and TX RP. Each RP may be signaled by a BS. All TX RPs may be connected to at least one RX RP.

An RP allocation method may be divided into a mode 1 and a mode 2. In the mode 1, a BS may indicate a resource in a specific RP. In the mode 2, a UE may select a specific RP, and may select a resource from an allocated resource pool set. For the mode 1, the UE shall be in an RRC_connected state. However, the mode 2 may operate in an RRC_idle state or an out-of-coverage state. Details thereof will be described with reference to FIG. 11.

Figure 11:
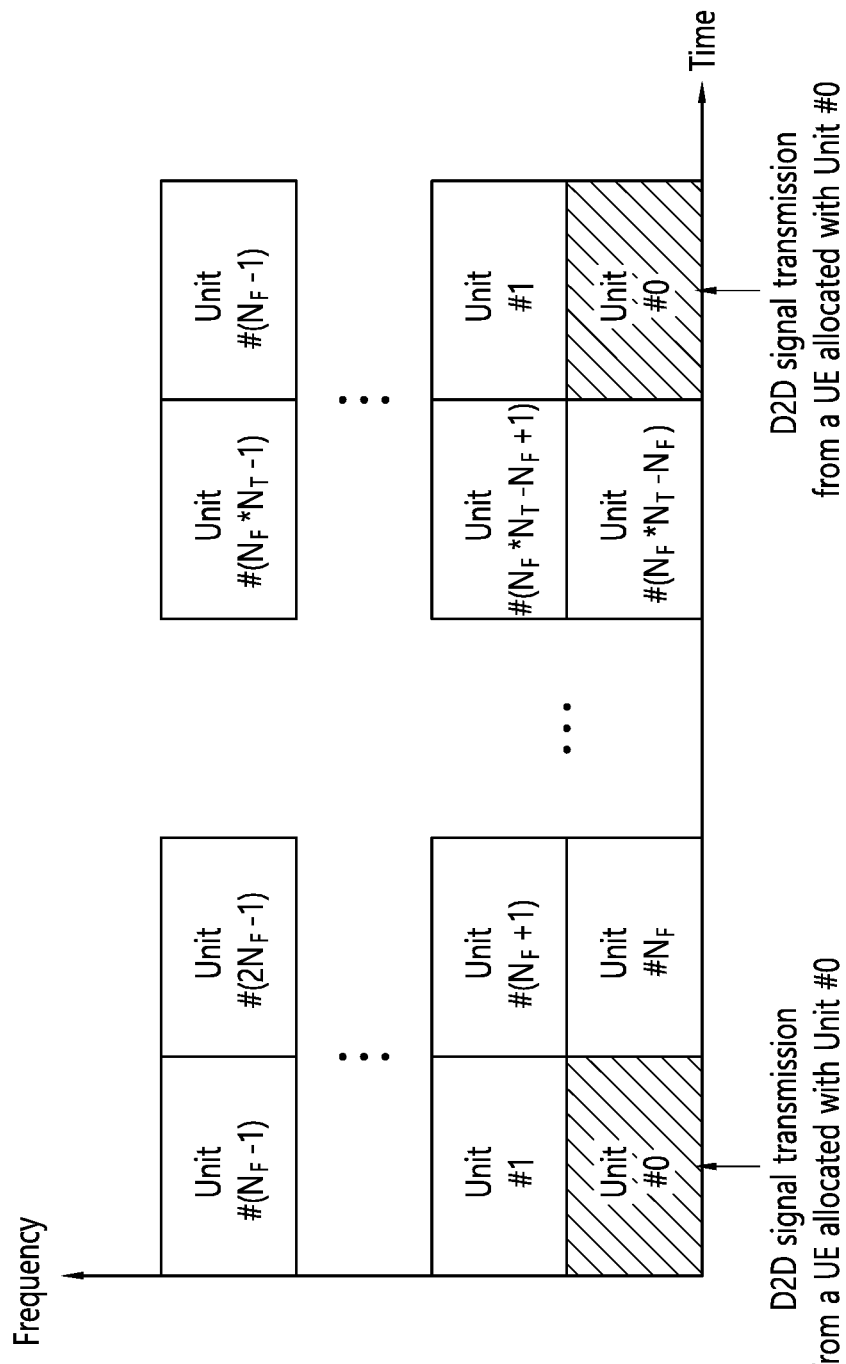
FIG. 11 shows another example of a resource pool for sidelink (SL) communication.

FIG. 11 shows another example of a resource pool for sidelink (SL) communication. The example of FIG. 11 may be used by a UE1 (i.e., transmitting UE) and UE2 (i.e., receiving UE) capable of performing communication through SL. In addition, when a network device such as an eNB transmits and receives a signal based on a communication scheme employed between UEs, the eNB may also be regarded as a kind of UE.

In the following description, the UE1 (transmitting UE) may operate to select a resource unit corresponding to a specific resource within a resource pool (RP) and to transmit a sidelink/D2D signal by using the corresponding resource unit. The UE2 (receiving UE) is configured for an RP to which the UE may transmit a signal, and detects the signal of the UE within the corresponding RP. If the UE1 is located within coverage of an eNB (i.e., in-coverage case), the RP may be informed by the eNB. Meanwhile, if the UE is located outside the coverage of the eNB (i.e., a partial coverage or out-of-coverage case), the RP may be informed by another UE or may be determined as a predetermined resource. In general, the RP consists of a plurality of resource units, and each UE may select one or more resource units to transmit its sidelink/2D signal.

FIG. 11 shows an example of a resource unit. Herein, the entire frequency resource is divided into N_F units, and the entire time resource is divided into N_T units, and thus the total number of resource units is N_F*N_T. In other words, it may be assumed that an RP of FIG. 11 is repeated with a period of N_T subframes (or other time units). That is, one resource unit may be repeated periodically as shown in FIG. 11. Alternatively, in order to obtain a diversity effect in the time and/or frequency dimension, an index of a physical resource unit to which one logical resource unit is mapped may vary based on a predetermined pattern as time elapses. In this situation, an RP for sidelink/D2D communication may imply a set of resource units which may be used for transmission by a UE (i.e., transmitting UE) intending to transmit a sidelink/D2D signal.

The aforementioned RP may be subdivided into various types. First, the RP may be classified into various types based on content of a sidelink/D2D signal transmitted in each RP. For example, the content of the D2D signal may be divided as shown below, and a separate RP (i.e., individual or different RP) may be configured for each case.

Content Example #1: Scheduling Assignment (SA) or Sidelink/D2D Control Channel

A control channel described herein is used for a signal including a resource position of a sidelink/D2D data channel transmitted by each transmitting UE in the same or succeeding time unit (e.g., subframe, TTI, slot, symbol) and control information (e.g., at least any one of MCS, MIMO transmission scheme, information element such as timing advance or the like) required to demodulate a corresponding data channel. The aforementioned signal may be transmitted together with the sidelink/D2D data by being multiplexed on the same resource unit. In this case, an SA resource pool means a pool for a resource on which SA is transmitted by being multiplexed with the sidelink/D2D data. An SA control channel may be called a sidelink/D2D control channel or the like. The SA may correspond to the PSCCH described in FIG. 9.

Content Example #2: Sidelink/D2D Data Channel

An individual resource pool (RP) may be allocated for a sidelink/D2D data channel through which a transmitting UE transmits user data by using a resource designated through scheduling assignment (SA). The sidelink/D2D data channel may correspond to the PSSCH described above in FIG. 9. If it may be transmitted together with sidelink/D2D data by being multiplexed on the same resource unit, a resource pool (RP) for the sidelink/D2D data channel may be configured to transmit only the sidelink/D2D data channel configured by excluding SA information. In other words, a resource element used to transmit SA information on an individual resource unit in an SA RP is still used in an RP of the sidelink/D2D data channel to transmit sidelink/D2D data.

Content Example #3: Discovery Channel

A transmitting UE transmits information such as its identity (ID) or the like so that a neighboring UE discovers the transmitting UE. A message used in this case is transmitted through a discovery channel or a physical sidelink discovery channel (PSDCH). An individual resource pool (RP) may be allocated for a corresponding channel.

Even if the aforementioned D2D signal carries the same content, a different resource pool (RP) may be utilized depending on a transmission and reception attributes of the D2D signal. For example, even if the same sidelink/D2D data channel or the same discovery message is transmitted, the RP may be further divided into another different RP depending on a scheme for determining transmission timing of the D2D signal (e.g., whether the D2D signal is transmitted at the time of receiving a synchronization reference signal or transmitted after a predetermined timing advance is applied at the time of receiving the synchronization reference signal), a resource allocation scheme (e.g., whether a transmission resource of an individual signal is allocated by a BS to each individual transmitting UE or whether an individual transmitting UE selects an individual signal transmission resource by itself within the resource pool), a signal format (e.g., the number of symbols occupied by each D2D signal in one subframe or the number of subframes used for transmission of one D2D signal), strength of a signal from the BS, or transmission power intensity of a D2D UE. As described above, a method in which the BS directly indicates a transmission resource of the transmitting UE in sidelink/D2D communication may be called the mode 1, and a method in which a transmission resource region is predetermined or in which the BS designates the transmission resource region and the transmitting UE directly selects a transmission resource may be called the mode 2. In case of D2D discovery, a case where the BS directly indicates a resource may be called a type 2, and a case where the UE directly selects a transmission resource from a predetermined resource region or a resource region indicated by the BS may be called a type 1.

An example of the present specification proposes a method and apparatus for solving a problem that a wireless signal cannot be received due to propagation delay or the like. Hereinafter, the problem in which a wireless signal cannot be received due to propagation delay or the like will be described.

Existing sidelink transmission is performed in a manner in which multiple wireless signals are transmitted/received through different frequency resources after synchronization is obtained by multiple UEs through a common synchronization reference. The above-described "synchronization reference" will be described in more detail below, but may be, for example, a satellite signal such as GNSS, a synchronization signal transmitted by a network entity such as a base station (eNB), or a sidelink synchronization signal (SLSS) transmitted by another UE through a sidelink. The UE obtaining synchronization through the above-described "synchronization reference" may start sidelink communication based on a symbol boundary derived from a common "synchronization reference." In addition, the receiving UE (RX UE) may acquire synchronization and set a receiver window (RX window) based on the symbol boundary set through the obtained synchronization. The receiver window may refer to a time interval in which decoding operation (e.g., a Fourier or Fast Fourier Transform (FFT) operation) is performed on a received signal in a storage such as a buffer/memory. The receiver window may correspond to a decoding operation (e.g., FFT operation) of a specific size and may correspond to, for example, a 2048 point FFT operation. In addition, the receiver window may correspond to a specific length of time (e.g., 1 ms) in a time domain. Also, the receiver window may be set to be equal to a length (e.g., the sub-frame, unit, and symbol described above).

The receiving UE may perform decoding in a manner of performing a decoding operation based on the receiver window. That is, the receiving UE may perform a decoding operation (e.g., an FFT operation) on a signal belonging to a receiver window section among all received signals and determine whether the corresponding signal is normally decoded. If the received signal is normally decoded, the receiving UE may perform an operation of transferring decoded data to a higher layer or other parts of the UE, and if the received signal is not normally decoded, the receiving UE may generate a NACK signal. That is, the receiving UE may decode the wireless signal based on the receiver window and extract a signal received from the transmitting UE through a specific frequency resource.

In a situation in which actual communication is performed, a point in time at which the transmitting UE (TX UE) starts transmission has a certain error from a symbol boundary derived from the above-described "synchronization reference". Further, an error due to propagation delay arriving from the transmitting UE (TX UE) to the receiving UE (RX UE) may be additionally applied. As a result, the wireless signal from the transmitting UE may reach the receiving UE at a different time point than the symbol boundary derived from the above-described "synchronization reference". In addition, when multiple wireless signals are received from one or multiple transmitting UEs, arrival times of each wireless signal may also be different. That is, a timing error with respect to the received signals may occur.

If the above-described timing error is maintained as an error within a cyclic prefix (CP) from the receiver window (RX window) of the receiving UE (RX UE), the receiving UE may orthogonally separate a desired signal from an unintended wireless signal through a normal decoding operation (e.g., FFT operation).

Figure 12:
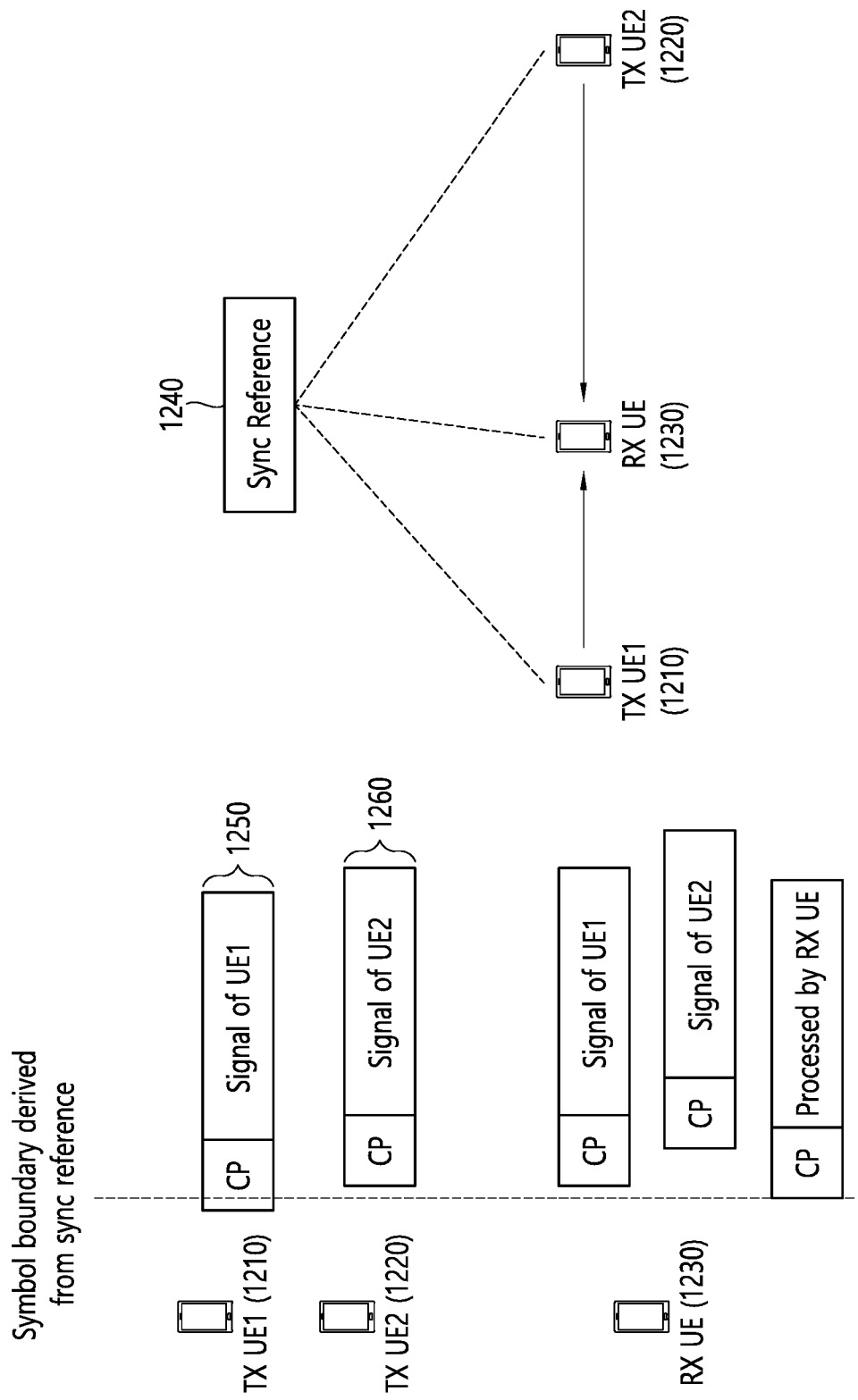
FIG. 12 shows an example in which a receiving UE decodes a wireless signal based on a receiver window.

FIG. 12 shows an example in which a receiving UE decodes a wireless signal based on a receiver window. Specifically, a transmission signal of a transmitting UE1 1210 may be positioned slightly ahead of the symbol boundary derived from the above-described "synchronization reference" and a transmission signal of a transmitting UE2 1220 may be located behind. In a state in which a TX timing error as shown in FIG. 12 occurs, signals from the transmitting UEs 1210 and 1220 may reach the receiving UE 1230 after undergoing propagation delay on a radio channel. According to FIG. 12, an arrival time error of the corresponding wireless signals is smaller than a length of a CP on a symbol boundary derived/obtained by the receiving UE 1230 from the synchronization reference 1240. In this case, even if the receiving UE 1230 discards the part corresponding to the CP and performs decoding on a subsequent part, all UE signals necessary for decoding are located in the receiver window. As a result, the UE may complete decoding for each signal by separating the transmission UE signals orthogonal to each other.

More specifically, in the example of FIG. 12, the transmitting UE1 1210, the transmitting UE2 1220, and the receiving UE 1230 may set synchronization based on the same synchronization reference 1240. Details of the synchronization reference will be described below. The symbol boundary derived from the synchronization reference 1240 is set as shown in FIG. 12, and here, since the transmitting UE1 1210 and the receiving UE 1230 are relatively close to each other and the transmitting UE2 1220 and the receiving UE 1230 are relatively away from each other, propagation delay for the first wireless signal received from the transmitting UE1 1210 to the receiving UE 1230 is relatively smaller and propagation delay for the second wireless signal received from the transmitting UE2 1220 to the receiving UE 1230 may be relatively larger. As a result, as illustrated in FIG. 12, the propagation delay for the first wireless signal 1250 is observed to be relatively small and the propagation delay for the second wireless signal 1260 is observed to be relatively large in the receiving UE 1230.

Figure 13:
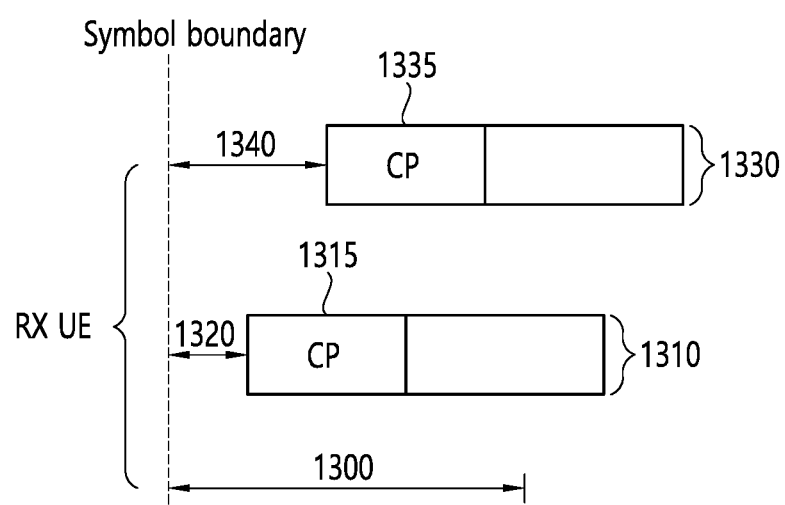
FIG. 13 is a diagram showing a relationship between a receiver window and a CP length of a wireless signal.

FIG. 13 is a diagram showing a relationship between a receiver window and a CP length of a wireless signal. A received first wireless signal 1310 may include at least one time unit (e.g., symbol), and the corresponding time unit may include a first CP 1315. If a size 1320 of propagation delay applied to the first wireless signal 1310 is shorter than the length of the first CP 1315, all information/bits of the first wireless signal 1310 are included in the receiver window 1300, and thus, the first wireless signal may be successfully decoded. However, if a size 1340 of propagation delay for a second wireless signal 1330 is longer than a length of a second CP 1335, some information/bits of the second wireless signal 1310 cannot be included in the receiver window 1300, and thus, the receiving UE may not successfully decode the second wireless signal 1330. In other words, if the difference 1320 between a start point of the symbol boundary derived from the synchronization reference and a reception time (i.e., a reception start time) of the first wireless signal is shorter than the length of the first CP 1315, it may be considered that the receiving UE has received all signals necessary for decoding. In addition, if the difference 1340 between the start point of the symbol boundary derived from the synchronization reference and the start point (i.e., the start point of reception) of the second wireless signal is short, it may be considered that the receiving UE has received all the signals necessary for decoding.

That is, the size (or length) of the propagation delay and the length of the CP are closely related, and when the CP length is set long enough, the problem of the propagation delay may be prevented. The length of the CP was generally determined according to a communication standard. In the conventional communication standard, a transmission time interval (TTI) is set relatively long, and thus, the length of the CP is also set long. That is, since the TTI applied to a wireless signal is set relatively long in the related art, the size of a time unit (e.g., symbol, subframe, slot, etc.) used to transmit/receive the wireless signal is also set to be relatively long. Accordingly, the length of the CP included in a specific time unit was also set relatively long.

However, in the above-mentioned NR standard, the length of the TTI is set shorter than in the existing standard. Accordingly, there is a high possibility that the length of the CP for a sidelink in a high frequency band, for example, in a millimeter wave (mmWave) band, is shortened. In this case, even if the transmitting UE (TX UE) transmits a wireless signal (or channel) in synchronization with a common sync reference, a timing error (e.g., a time error due to propagation delay) of the wireless signal received by the receiving UE may be greater than the length of CP. In this case, if a receiver window (RX window) is set according to the related art method and a decoding operation (e.g., FFT) is performed, decoding performance of the receiving UE may be deteriorated. For example, not all of the bits/components of a desired signal are included in one receiver window (RX window) set by the receiving UE or if an undesired signal (e.g., inter-symbol Interference) may be included therein. In addition, if multiple wireless signals or channels are received by the receiving UE in an FDM manner, orthogonality is not guaranteed for each signal/channel, causing interference (e.g., inter-carrier Interference) between multiple wireless signals/channels.

Figure 14:
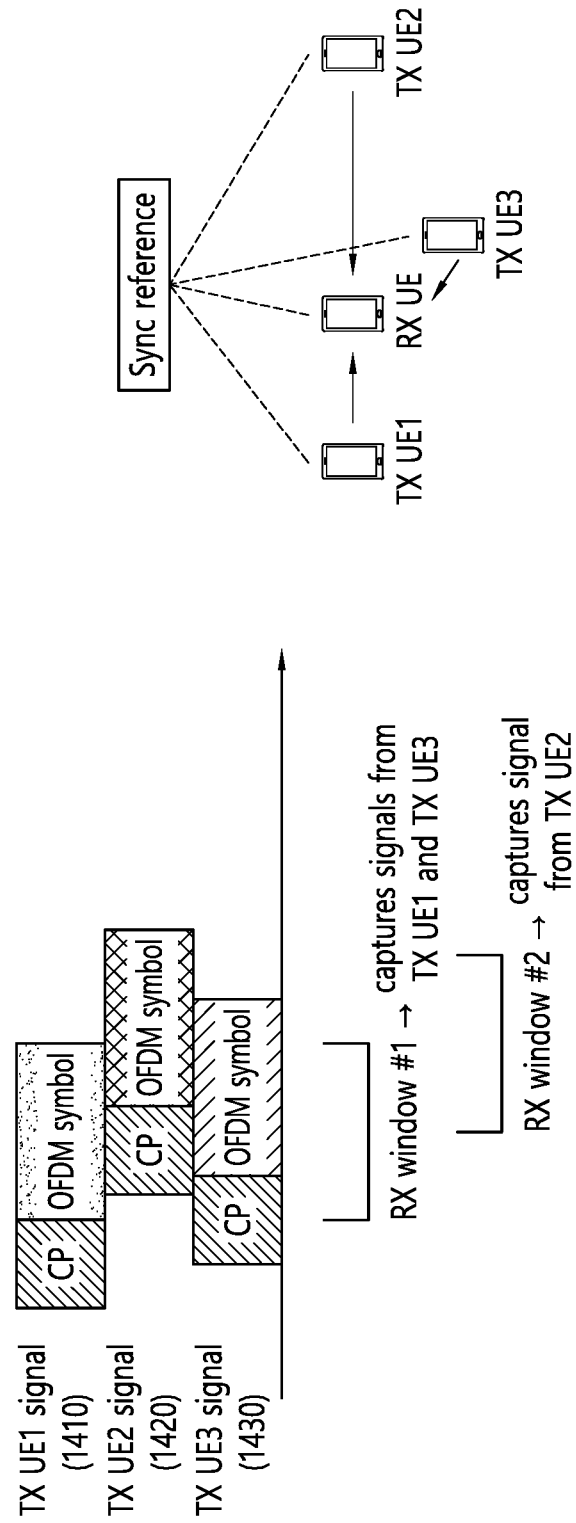
FIG. 14 is a view illustrating a problem that occurs when a plurality of reception signals are received.

FIG. 14 is a view illustrating a problem that occurs when a plurality of reception signals are received. The example of FIG. 14 relates to an example in which the receiving UE and all transmitting UEs acquire synchronization through the same one "synchronization reference". As shown on the right of FIG. 14, distances between the receiving UE and the transmitting UE1/UE3 are similar. Accordingly, the receiving UE may set one receiver window (e.g., RX window #1 as shown) and perform decoding based on one receiver window. Specifically, a difference in time at which the first/third wireless signals 1410 and 1430 received from the transmitting UE1/UE3 are received at the receiving UE (i.e., a time for reaching the receiving UE) is within the CP length (the common CP length included in the first and third wireless signals), the receiving UE may receive all signals/bits required for a decoding operation (e.g., FFT operation). Accordingly, one receiver window for the first/third wireless signal may be set. However, since a relatively large delay is applied to a wireless signal 1420 received from the transmitting UE2 , if the receiving UE sets only one receiver window (e.g., RX window #1 as shown) to perform a decoding operation (e.g., FFT operation), reception performance may be deteriorated due to ICI/ISI.

Therefore, an example of the present specification proposes a technique of setting a plurality of receiver windows and performing decoding based on the plurality of receiver windows.

Meanwhile, the example of FIG. 14 is an example related to propagation delay by a plurality of transmitting UEs performing transmission from different locations. That is, the example of FIG. 14 relates to a case where propagation delay of different sizes (i.e., different time lengths) is problematic. However, a problem due to a single receiver window may occur even for multiple wireless signals to which the same propagation delay is applied. Specifically, if the first wireless signal includes a CP having a first length and the second wireless signal includes a CP having a second length (different from the first length), a plurality of receiver windows may be required even if the same propagation delay is applied to the first/second wireless signals.

Figure 15:
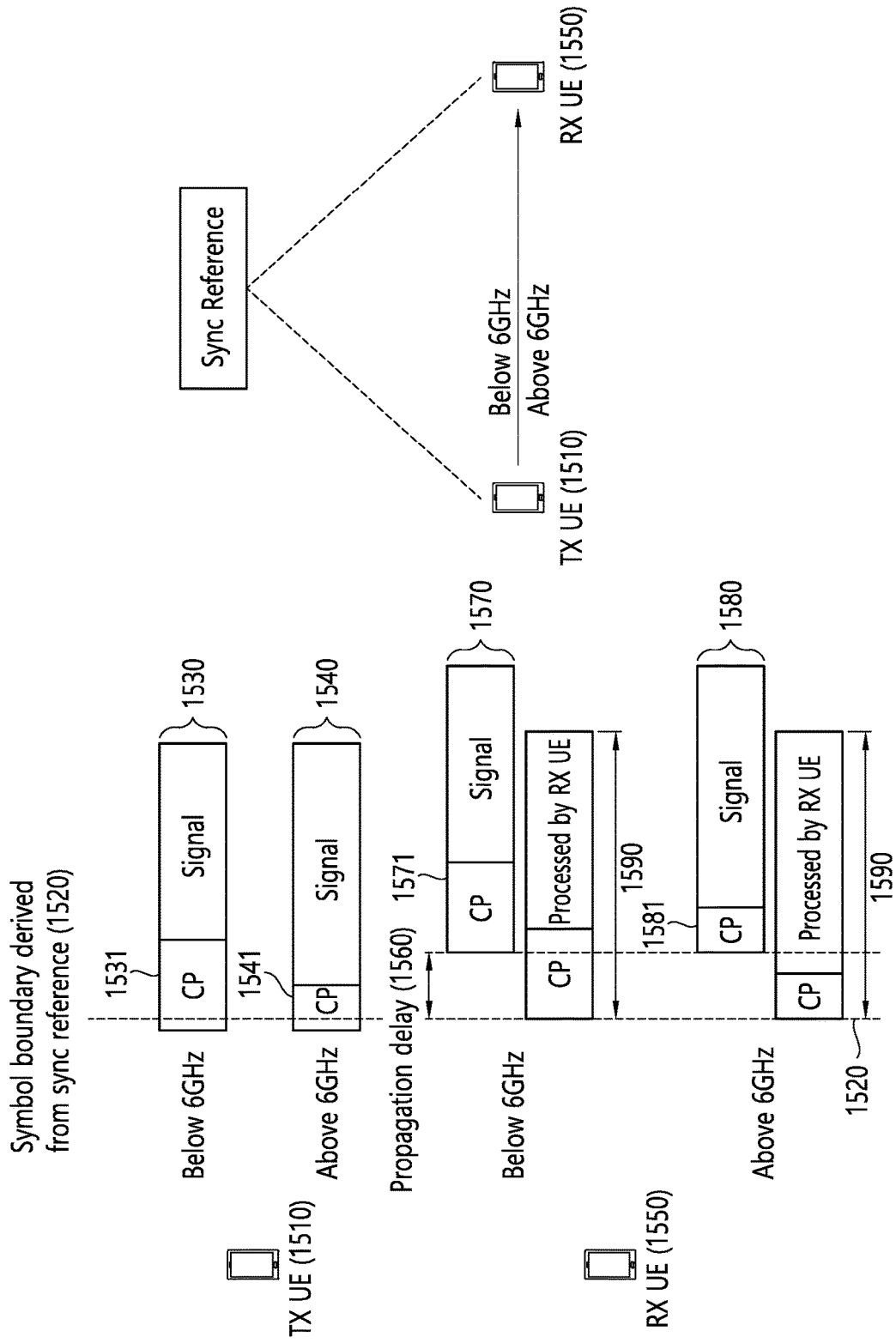
FIG. 15 shows an example in which CPs having different lengths are applied to different wireless signals.

FIG. 15 shows an example in which CPs having different lengths are applied to different wireless signals. The example of FIG. 15 relates to an example in which the receiving UE 1550 receives a plurality of wireless signals 1570 and 1580. The plurality of wireless signals 1570 and 1580 may be received from the same or different transmitting UEs, and in the example of FIG. 15, the plurality of wireless signals 1570 and 1580 are received from the same transmitting UE 1510. The plurality of wireless signals 1570 and 1580 received by the receiving UE correspond to the plurality of wireless signals 1530 and 1540 transmitted by the transmitting terminal 1510. For example, the plurality of wireless signals 1570 and 1580 received by the receiving UE 1550 may be transmitted through different frequency bands (e.g., different transmission carriers). In this case, one may be received through a first frequency band (e.g., below 6 GHz band) and the other may be received through a second frequency band (e.g., above 6 GHz band).

In the example of FIG. 15, the transmitting UE 1510 and the receiving UE 1550 may acquire synchronization through the same "synchronization reference". Accordingly, a symbol boundary 1520 derived through one "synchronization reference" may be set. First CPs 1153 and 1571 may be applied/included in the first wireless signal 1570, and second CPs 1541 and 1581 may be applied/included in the second wireless signal 1580.

As shown, lengths of the first CPs 1531 and 1571 (i.e., a transmission time on the time domain) may be longer than those of the second CPs 1541 and 1581. Additionally or alternatively, the same/different numerology or subcarrier spacing may be applied to the first wireless signal 1570 and the second wireless signal 1580. Additionally or alternatively, the first CPs 1531 and 1571 and the second CPs 1541 and 1581 may be derived from the same sequence having the same bit length (or different sequences having the same bit length).

As shown, the same (or substantially the same) propagation delay is applied to the first wireless signal 1570 and the second wireless signal 1580 received by the receiving UE 1550 of FIG. 15. However, if the size of the propagation delay is larger than the length of the second CP 1581, the receiving UE 1550 preferably sets a plurality of receiver windows.

Specifically, if the length of the first CP 1571 is set longer than the length of the second CP 1581, even if only a single receiver window 1590 is set, all bits of the first wireless signal/Information may be received through a receiver window 1590. That is, since a difference between the start time of the receiver window 1590 and a reception time (arrival time) of the first wireless signal 1570 is smaller than the length of the first CP 1572, the receiving UE 1550 may normally decoding the first wireless signal 1570. However, as shown, since a difference between the start time of the receiver window 1590 and a reception time (arrival time) of the second wireless signal 1580 is greater than that of the length of the second CP 1561, reception performance may be deteriorated due to ICI/ISI when the second wireless signal 1580 is decoded.

Accordingly, it is preferable that the receiving UE sets a plurality of receiver windows and it is preferable that start times of the plurality of receiver windows are set to be different. That is, it is preferable that the plurality of receiver windows partially overlap in the time domain. A specific example of this embodiment will be described in more detail below.

Figure 16:
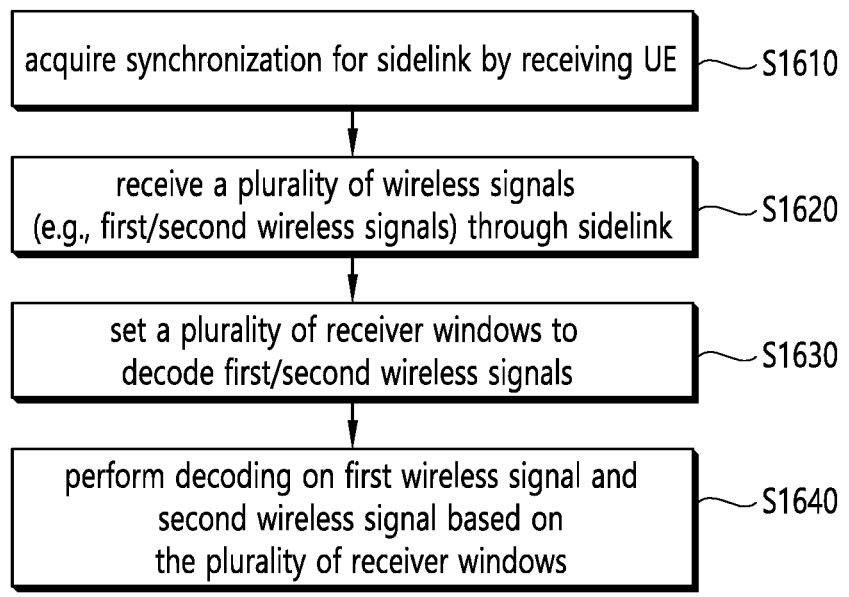
FIG. 16 is a flowchart of a procedure according to an example of the present disclosure.

FIG. 16 is a flowchart of a procedure according to an example of the present disclosure.

As shown, the receiving UE acquires synchronization for a sidelink (S1610). Thereafter, the receiving UE receives a plurality of wireless signals (e.g., first/second wireless signals) through the sidelink (S1620). A first CP may be applied/included in the first wireless signal, and a second CP may be applied/included in the second wireless signal. The receiving UE may set a plurality of receiver windows in order to decode the first/second wireless signals (S1630). Start times of the plurality of receiver windows may be set to be different. In other words, the plurality of receiver windows may partially overlap in the time domain. The receiving UE may decode the first wireless signal and the second wireless signal based on the plurality of receiver windows (S1640).

Hereinafter, step S1610 of FIG. 16 will be described in detail.

In step S1610, some of the synchronization-related features described below may be used. That is, the transmitting UE and the receiving UE may acquire synchronization from one "synchronization reference" according to the following method and specify a symbol boundary accordingly. The receiving UE does not need to specify different symbol boundaries for the aforementioned multiple wireless signals (first/second wireless signals). Accordingly, the time synchronization acquired by the receiving UE may be commonly applied to a plurality of wireless signals (first/second wireless signals). In an example of the present specification, "synchronization reference" may be a common one, but an example of the specification is not limited thereto. Specifically, in an example of the present specification, "synchronization references" may be different from each other. For example, UE1 according to the present specification (e.g., may be a transmitting UE or a receiving UE or may be an LTE V2X UE or an NR V2X UE like other UEs described herein) and UE2 (e.g., may be a transmitting UE or a receiving UE or LTE V2X UE or NR V2X UE like other UEs described herein) may derive symbol boundaries from different synchronization references but each symbol boundary may be determined the same. Specifically, UE1 may be a synchronization reference (sync reference) for transmitting an SLSS, which is described below, while operating based on a GNSS (or eNB, gNB, LTE UE) synchronization reference described later, in which case the synchronization reference of UE1 may be the GNSS. Meanwhile, UE2 may not acquire a GNSS signal, and in this case, UE2 may perform synchronization based on an SLSS transmitted by UE1. As a result, the synchronization reference of UE2 (i.e., the direct synchronization reference) may be UE1 operating based on GNSS (or eNB/gNB). In this case, UE1 and UE2 may be treated as having different direct synchronization references, but if UE2 successfully decodes the SLSS of the UE1, the symbol boundaries obtained by UE1 and UE2 will be the same. Accordingly, in the example of the present specification, the number of "synchronization reference" is not limited to one.

As an example of a synchronization signal for a sidelink, a sidelink synchronization signal (SLSS) may be defined, and a primary sidelink synchronization signal (PSSS) and a secondary sidelink synchronization signal (SSSS) are defined in the SLSS. Meanwhile, the physical SL broadcast channel (PSBCH) described in FIG. 9 is mapped to an SL broadcast control channel (SBCCH) that transmits a control signal for synchronization, etc., and the SLSS and PSBCH may be transmitted together or separately.

A synchronization source for the sidelink may vary depending on the state of the UEs. That is, the synchronization source may be set to be different according to whether the UE is an in coverage (INC) UE or an out-of-coverage (OCC) UE. A specific example is as follows.

Figure 17:
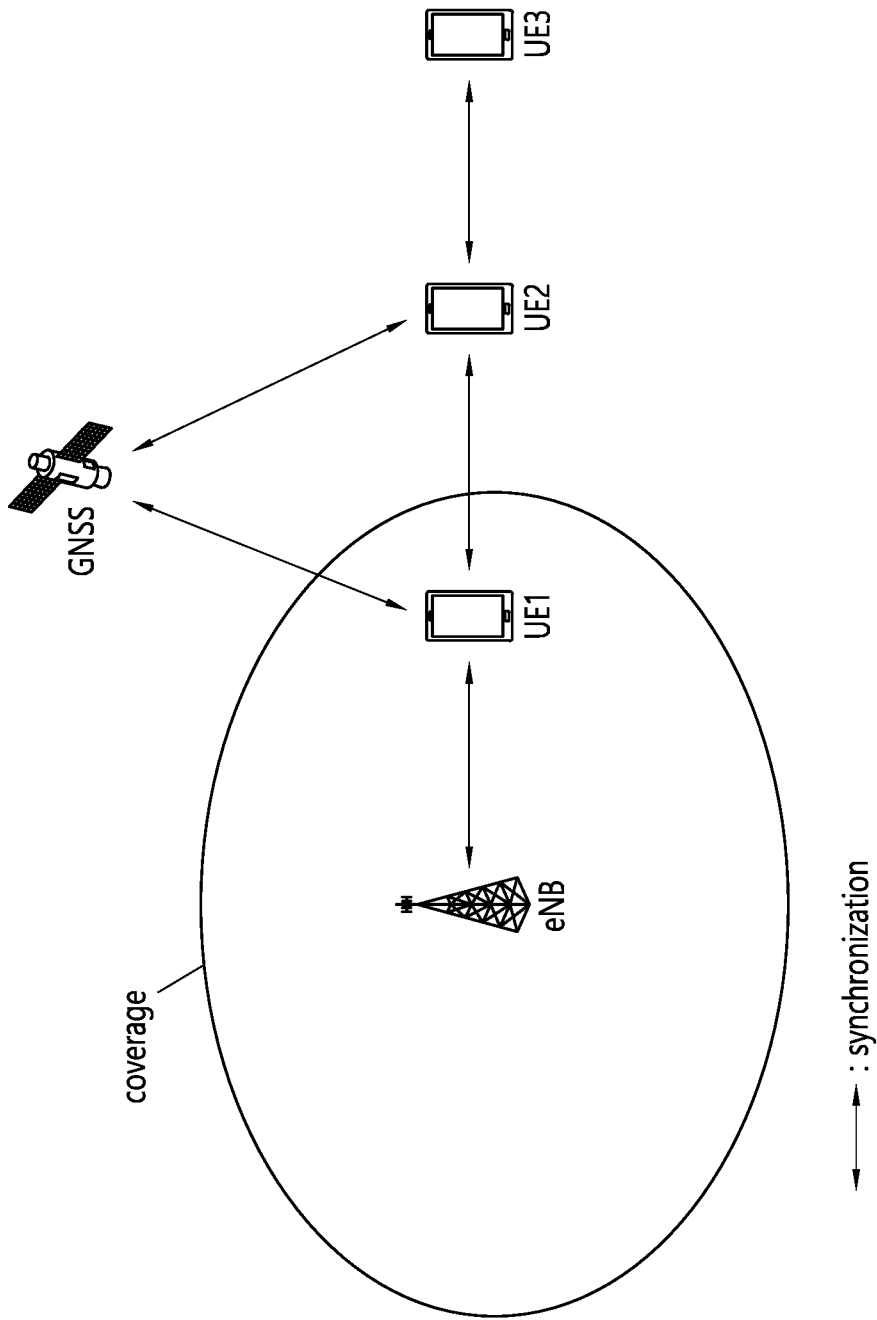
FIG. 17 is a diagram illustrating a procedure for performing synchronization in a UE.

FIG. 17 is a diagram illustrating a procedure for performing synchronization in a UE. Referring to FIG. 17, UE 1 is a UE (INC UE) within cell coverage of a base station (eNB) and may directly receive a signal necessary for synchronization from the BS and perform synchronization with the BS. In this case, the BS may be referred to as a synchronization reference for UE 1, and UE 1 may be expressed as being directly synchronized with the BS. In addition, the UE 1 may directly receive a signal necessary for synchronization from a global navigation satellite system (GNSS) and perform synchronization with the GNSS. In this case, GNSS may be referred to as a synchronization reference for UE 1, and UE 1 may be expressed as being directly synchronized with GNSS. UE 1 may transmit SLSS and/or PSBCH for another UE after synchronization with the BS or GNSS.

UE 2 is a UE (OOC UE) located outside the cell coverage of the BS and may directly receive a signal necessary for synchronization from GNSS to perform synchronization with the GNSS. In this case, the GNSS may be referred to as a synchronization reference for UE 2. In addition, the UE 2 may perform synchronization by receiving a signal necessary for synchronization from the UE 1. UE 2 may transmit SLSS and/or PSBCH for another terminal after synchronization with the GNSS or UE 1.

UE 3 is a UE (OOO UE) located outside the cell coverage of the BS and may perform synchronization by receiving a signal required for synchronization from UE 2. UEs 1, 2, and 3 may be sidelink UEs/V2X UEs that support sidelinks.

An OOO UE such as UE 2 may perform an SLSS (/PSBCH) transmission operation, and to this end, SLSS (/PSBCH) resources may be set. Here, in the case of an OOO UE having a synchronization channel reference resource based on a global satellite navigation system (GNSS), i) an SLSS (/PSBCH) resource that receives a PSBCH (/SLSS) from another UE (e.g., an INC UE) and relays the same and ii) an SLSS (/PSBCH) resource and ii) SLSS (/PSBCH) resource that transmits the PSBCH (/SLSS) after the OOO UE (directly) selects a GNSS synchronization reference may be set (/signaled) differently (or independently) in the time domain. That is, in FIG. 17, the UE 2 receives the SLSS/PSBCH from the UE 1 and transmits/relays the SLSS/PSBCH resource, and is used when transmitting the SLSS/PSBCH after performing synchronization with the GNSS. SLSS/PSBCH resources may be configured/signaled differently or independently.

Hereinafter, steps S1620 and S1630 of FIG. 16 will be described in detail. According to step S1620, the receiving UE may receive a plurality of wireless signals (e.g., first/second wireless signals) through the sidelink. In addition, the receiving UE sets a plurality of receiver windows through step S1630. As described above, each of the plurality of receiver windows may correspond to a decoding operation (e.g., FFT operation) having a specific size and may correspond to, for example, a 2048 point FFT operation. Further, each of the receiver windows may correspond to a specific length of time (e.g., 1 ms) in the time domain. In addition, the receiver window may be set equal to a length of a specific time unit (e.g., the above-described subframe, unit, symbol). Each of the plurality of receiver windows may have the same length. The setting of the plurality of receiver windows includes determining a start time point of the plurality of receiver windows.

The receiving UE performing step S1630 may set a plurality of receiver windows "which partially overlap in the time axis". In this case, each receiver window may be (1) shifted at equal intervals in the time axis and (2) shifted at non-uniform intervals.

Figure 18:
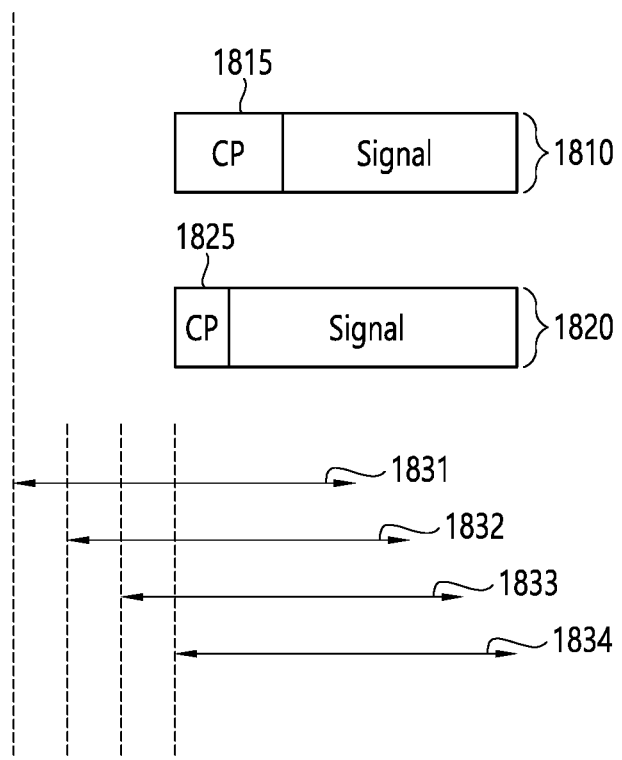
FIG. 18 shows an example in which a plurality of receiver windows are configured.

FIG. 18 shows an example in which a plurality of receiver windows are set.

As shown, a first wireless signal 1810 and a second wireless signal 1820 may be received. Also, a first CP 1815 may be included/applied to the first wireless signal 1810 and a second CP 1825 may be included/applied to the second wireless signal 1820. The receiving UE performing step S1630 may set a plurality of receiver windows 1831, 1832, 1833, and 1834. Each of the plurality of receiver windows 1831, 1832, 1833, and 1834 as illustrated may be commonly used for decoding the first wireless signal 1810 and the second wireless signal 1820. A specific number of the receiver windows as shown and a length of a signal may be changed.

As shown, the receiving UE may locate the receiver windows 1831, 1832, 1833, and 1834 at equal intervals. In this case, a difference (i.e., a shift value applied to the receiver windows) in the start time of the receiver windows 1831, 1832, 1833, and 1834 may be determined to be the same as a length of a smaller one of the first CP 1815 and the second CP 1825. The example of FIG. 18 relates to a situation in which two wireless signals 1810 and 1820 are received, but the number of received wireless signals may be three or more. In this case, the difference in the start time of the receiver window may be the smallest one of lengths of the CPs included/applied to three or more wireless signals. This is because, as described in FIGS. 13 and 15, when the receiver window is shifted by the length of the CP, the UE may receive all signals necessary for decoding. Meanwhile, information on the lengths of the first CP 1815 and the second CP 1825 may be set in advance, may be provided in the form of "assist information" described later, or may be received in advance through a channel in which the first wireless signal 1810 is received. In the example of FIG. 18, the difference between the start times of all receiver windows is determined as a minimum CP. However, the example of the present specification is not limited thereto. For example, the difference between the start times of the plurality of windows based on "assist information" described later may be a certain multiple of the CP length (e.g., CP length*arbitrary integer n). Additionally or alternatively, the plurality of receiver windows 1831, 1832, 1833, and 1834 are arranged at CP length intervals, but it is also possible that some of the plurality of receiver windows are omitted, and consequently, the plurality of receiver windows are non-evenly arranged. The receiving UE may confirm that the wireless signal will not reach in a specific time interval based on "assist information" described later, because, in this case, it is possible to omit at least one corresponding receiver window.

The example of FIG. 18 is an example in which the first receiver window 1831 is set from the start time of the symbol boundary. However, if the receiving UE knows additional control information (hereinafter "assist information") for the first/second wireless signals 1810 and 1820, it is possible to optimize the position of each receiver window and the arrangement of the entire receiver windows. For example, the receiving UE may optimize configuration of the receiver windows 1831, 1832, 1833, and 1834 according to the presence or absence or types of "assist information", such as information related to a distance between the receiving UE and the transmitting UE (e.g., a timing gap between an arrival time of the first/second wireless signals and the OFDM symbol boundary). In addition, the receiving UE may optimize arrangement of the entire receiver windows in consideration of the presence and absence of a shift value to a preset (or signaled) specific time axis and/or the number of (maximum) receiver windows that can be set by the receiving UE and/or the number of receiver windows preconfigured from the network and/or CP lengths (or difference, distribution of the CP lengths, etc.) of the channel signal(s) received by the receiving UE. Of course, if there is no such "assist information", the receiving UE may set the plurality of receiver windows 1831, 1832, 1833, and 1834 at equal intervals from the start time of the symbol boundary in consideration of only the number of its configurable (maximum) receiver windows. The "assist information" described above may be received through a channel in which the first wireless signal 1810 is received. Additionally, the intervals of the receiver windows 1831, 1832, 1833, and 1834 may be set non-uniformly. For example, the receiving UE may arrange the receiver windows so that reception may be intensively performed in a specific time interval based on the channel information, and such channel information may be obtained through "assist information".

Meanwhile, the "number of (maximum) receiver windows" that may be set in the receiving UE may be defined as a kind of reception capability information of the corresponding UE. In other words, the receiving UE may report information on how many (maximum) receiver windows may be used in one carrier, as its reception capability information, to a network or the like. The receiving UE may report the reception capability information to the network in the in-coverage state described in FIG. 8. After reporting the reception capability information to the network, the receiving UE may receive arrangement information of a plurality of receiver windows (information regarding the number, location, etc. of the receiver windows) from the network, and set a plurality of receiver windows based on the received information. In addition, the receiving UE may report the reception capability information based on service priority related to received wireless signals. For example, it is also possible to receive arrangement information regarding a plurality of receiver windows from the network only when a service having a high priority is received. Meanwhile, the above-described carrier may refer to a radio resource for transmitting the first wireless signal 1810 and/or the second wireless signal 1820 and may refer to, for example, a bandwidth part (BWP) defined in a cell of the related art LTE standard or NR standard or a group of a predetermined number of subcarriers. Meanwhile, the reception capability information regarding "the number of (maximum) receiver windows" may be determined by (1) the number of carriers that the receiving UE is receiving and/or (2) computing capability of the receiving UE (e.g., the maximum number of RBs that may be decoded by the UE in one carrier). For example, if the receiving UE is receiving channel/signal on a small number of carriers, the corresponding UE may focus its FFT processing (computing) power on a specific carrier.

That is, more RX windows may be set for a specific carrier and used for channel/signal reception.

The receiving UE may determine the number of receiver windows actually used by the receiving UE in consideration of some or all of the following items. For example, the receiving UE may determine the number of receiver windows (or a specific arrangement) based on the neurology or subcarrier spacing applied to the wireless signal (or channel) and may determine the number of receiver windows (or specific arrangement) in consideration of a target range of a service being received (target range)) and/or a "time synchronization error", etc. For example, in the case of the target range, when the receiving UE acquires information regarding a service ID or a service requirement, the receiving UE may predict a (maximum) distance between the receiving UE and the transmitting UE and thus predict maximum propagation delay that may be applied to the received wireless signal. For example, when it is predicted that a service that is receiving (or intends to receive) is to be received from a short distance, it is possible to predict a size of expected maximum propagation delay, so that the number of windows used by the receiving UE may be relatively small. In other words, if the target range of a service which may be supported (or which will be supported) to a receiving UE is short, it may be predicted that there is a high probability that UEs transmitting a channel/signal related to the corresponding service are located at an adjacent distance from the receiving UE. Therefore, the distance difference between the transmitting and receiving UEs may not be too large (compared to a service with a large target range). Therefore, the network may configure/preconfigure a relatively small number of RX window settings for a UE that wants to receive a service with a short target range or which is receiving the service.

Meanwhile, a relatively long CP may be set/applied/included in the above-described first wireless signal, and the first wireless signal may be received through a first frequency band (e.g., below 6 GHz band). In contrast, a relatively short CP may be set/applied/included in the above-described second wireless signal, and the second wireless signal may be received through a second frequency band (e.g., above 6 GHz band). In summary, the first wireless signal and the second wireless signal may be classified according to the frequency band and/or the length of the CP.

Additionally or alternatively, the first wireless signal and second wireless signal described above may be classified according to contents of information transmitted by the corresponding signal. For example, the first wireless signal may be an SLSS, a PSBCH, or a PSCCH or may include a discovery channel which is periodically transmitted. For example, the second wireless signal may be a data transmission channel/signal (e.g., PSBCH). In this case, it is possible for the receiving UE to determine the number/maximum number/arrangement method/arrangement position of the plurality of receiver windows that the receiving UE sets through the first wireless signal (e.g., synchronization signal and/or control information) as described above.

In addition, the first and second wireless signals may be classified in consideration of both the corresponding CP length and the contents of the information. For example, a relatively long CP may be set/applied/included in the first wireless signal and a data transmission channel/signal transmitted in below 6 GHz band may be included therein, and a relatively short CP may be set/applied/included in the second wireless signal and a synchronization signal and/or control information transmitted in above 6 GHz band may be included therein.

The example described above may be modified as follows. For example, each wireless signal may include a preset preamble. The preamble, as a signal generated through a predetermined bit sequence, may refer to a signal that may be easily decoded by the receiving UE.

Figure 19:
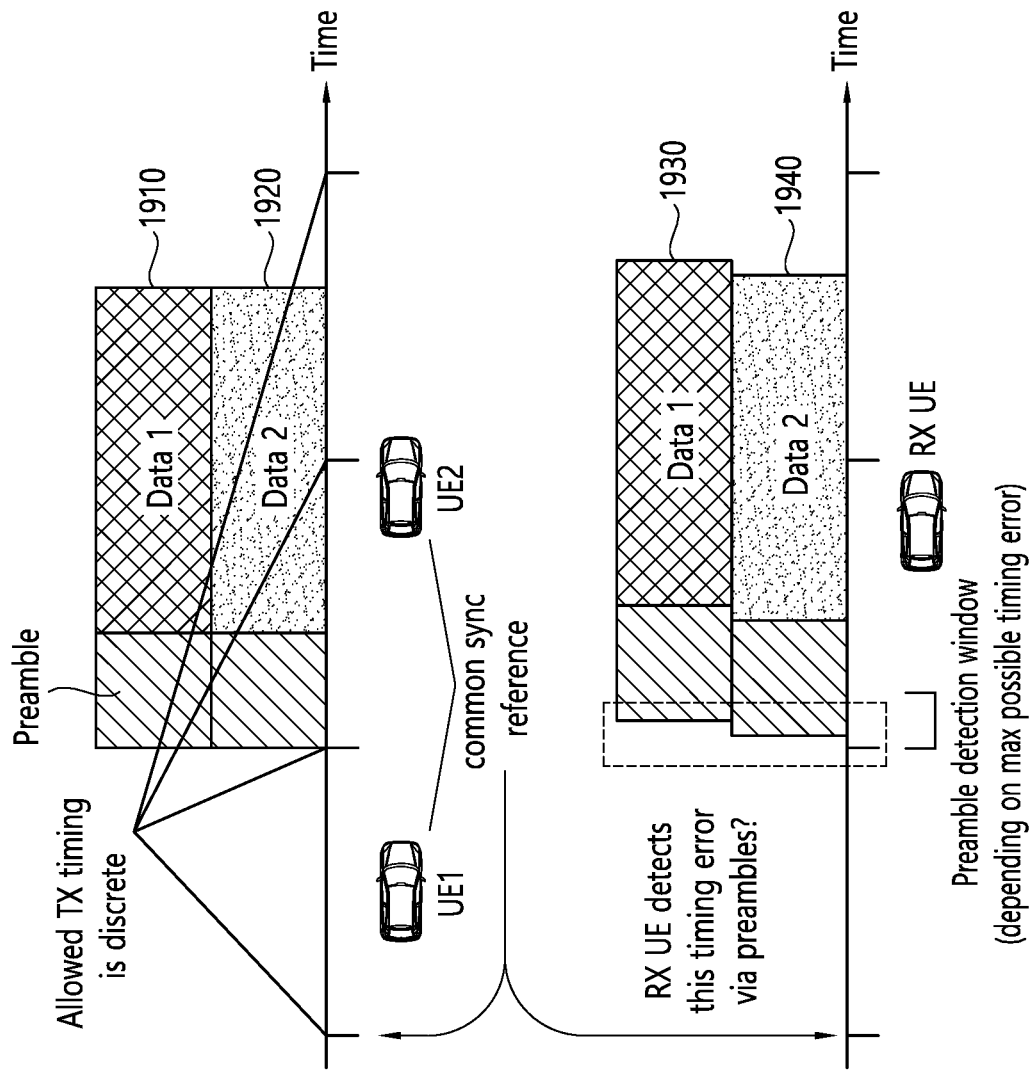
FIG. 19 shows an example of decoding wireless signals via preambles.

FIG. 19 shows an example of decoding wireless signals via preambles. According to the example of FIG. 19, the receiving UE may perform decoding on a preamble to specify a time point at which a decoding operation should be performed, and perform a decoding operation (e.g., FFT operation) by applying a receiver window from the specified time point to. Specifically, the transmitting UEs may transmit a plurality of transmission signals 1910 and 1920 by attaching a preamble, and the receiving UE may perform preamble detection on the received wireless signals 1930 and 1940. The receiving UE may detect reception timing errors of individual signals/data 1930 and 1940 through the preamble. In this case, a window size for preamble detection may be promised/signaled in advance in consideration of a (maximum) possible timing error. The method of FIG. 19 may be combined with a method of using multiple receiver windows. For example, the reception timing error (gap) information for each data detected by the receiving UE (or network) may be utilized as assist information for determining a method for setting (or configuring) single/multiple RX windows to be used by the receiving UE (e.g., RX window timing adjustment and/or the number of RX windows to be set by the corresponding receiving UE). The receiving UE may have an advantage of efficiently managing processing/computing power required for the FFT operation of the receiving UE by reducing the number of required RX windows, while removing/alleviating ICI based on assist information.

The same or different numerology (or subcarrier spacing) may be applied to the first wireless signal 1930 and the second wireless signal 1940 among the plurality of wireless signals according to the example of FIG. 19. In addition, one of the plurality of wireless signals 1930 and 1940 may be received through a first frequency band (e.g., below 6 GHz band), and the other one may be received through a second frequency band (e.g., above 6 GHz band). A time length for transmitting the preamble included in the first wireless signal 1930 is preferably set to be the same as a time length for transmitting the preamble included in the second wireless signal 1940. If the same or different numerology (or subcarrier spacing) is applied to the first wireless signal 1930 and the second wireless signal 1940, the time length of each preamble may be set to be the same by adjusting lengths of bit sequences generating the respective preambles.

The following is an example of a UE (transmitting or receiving terminal/UE) to which an example of the present specification is applied.

Figure 20:
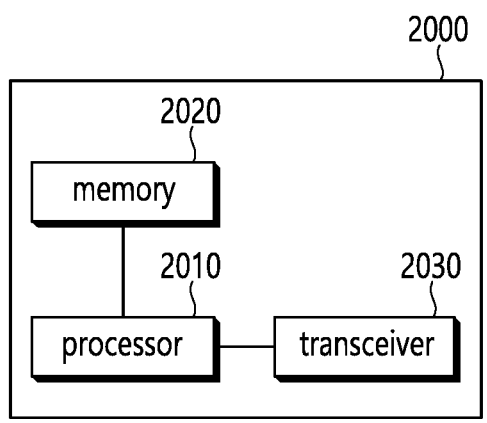
FIG. 20 shows an example of a UE to which an example of the present specification is applied.

FIG. 20 shows an example of a UE to which an example of the present specification is applied.

Referring to FIG. 20, a UE 2000 includes a processor 2010, a memory 2020, and a transceiver 2030. The illustrated processor, memory, and transceiver may each be implemented as a separate chip, or at least two or more blocks/functions may be implemented through one chip.

The illustrated transceiver 2030 performs a signal transmission/reception operation. Specifically, the transceiver 2030 performs an operation of receiving first and second wireless signals. In addition, the transceiver 2030 may perform a decoding operation (e.g., FFT operation) based on a receiver window set by the processor 2010. To this end, the transceiver 2030 may include a receiver window controller (not shown) that extracts a part of the received signal and a decoding operation processor (not shown) that performs a decoding operation on the signal extracted through the receiver window.

The processor 2010 may implement the functions, processes, and/or methods proposed herein. Specifically, the processor 2010 may determine the number/arrangement of the receiver windows for the second wireless signal based on the first wireless signal obtained through the transceiver 2030, and delivers the determined information to the transceiver 2030.

The processor 2010 may include an application-specific integrated circuit (ASIC), other chipsets, logic circuits, and data processing devices. The memory 2020 may include a read-only memory (ROM), a random access memory (RAM), a flash memory, a memory card, a storage medium, and/or other storage devices.

Figure 21:
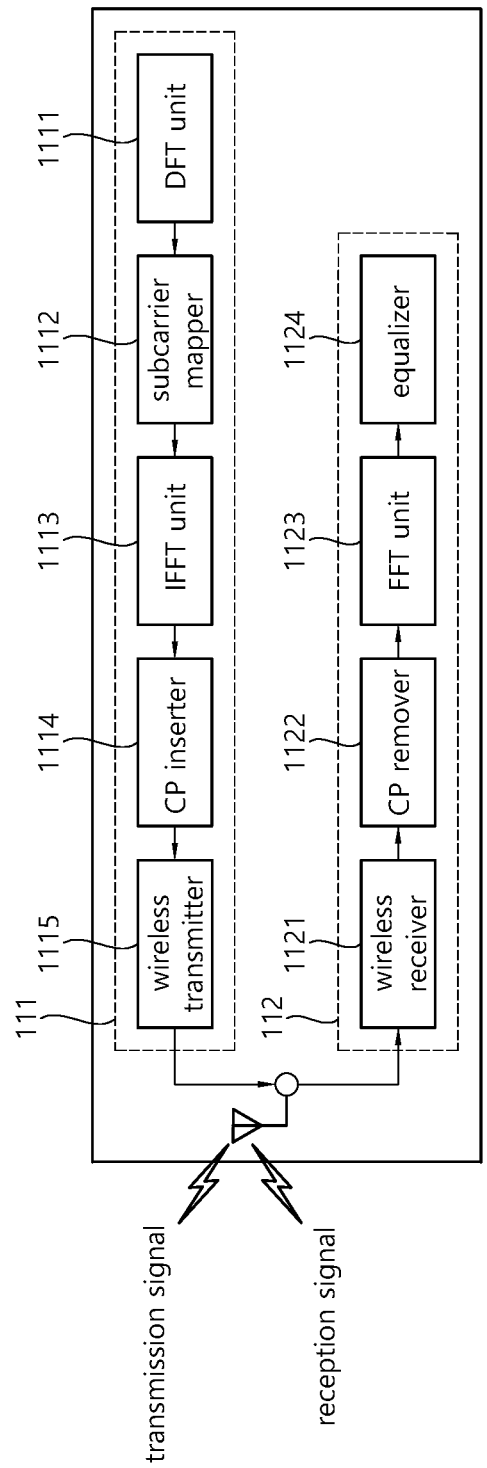
FIG. 21 shows an example of a transceiver according to an example of the present specification.

FIG. 21 shows another example of a detailed block diagram of a transceiver. Referring to FIG. 21, the transceiver 110 includes a transmitting part 111 and a receiving part 112. The transmitting part 111 includes a Discrete Fourier Transform (DFT) unit 1111, a subcarrier mapper 1112, an IFFT unit 1113, a CP inserter 1144, and a wireless transmitter 1115. The transmitting part 111 may further include a modulator. In addition, the transmitting part may further include, for example, a scramble unit (not shown), a modulation mapper (not shown), a layer mapper (not shown), and a layer permutator (not shown), and this may be disposed before the DFT unit 1111. That is, in order to prevent an increase in peak-to-average power ratio (PAPR), the transmitting part 111 allows information to pass through the DFT unit 1111 before mapping a signal to a subcarrier. A signal spread (or precoded) by the DFT unit 1111 is subcarrier-mapped through the subcarrier mapper 1112 and generated as a signal on a time axis through the IFFT unit 1113.

The DFT unit 1111 performs DFT on input symbols to output complex-valued symbols. For example, if Ntx symbols are input (where Ntx is a natural number), a DFT size (size) is Ntx. The DFT unit 1111 may be referred to as a transform precoder. The subcarrier mapper 1112 maps the complex-valued symbols to each subcarrier of a frequency domain. The complex-valued symbols may be mapped to resource elements corresponding to a resource block allocated for data transmission. The subcarrier mapper 1112 may be referred to as a resource element mapper. The IFFT unit 1113 performs IFFT on an input symbol to output a baseband signal for data, which is a time domain signal. The CP inserter 1114 copies a part of a rear portion of the base band signal for data and inserts it into a front portion of the base band signal for data. Inter-symbol Interference (ISI) and inter-carrier Interference (ICI) are prevented through CP insertion, so that orthogonality may be maintained even in a multi-path channel.

Meanwhile, the receiving part 112 includes a wireless receiver 1121, a CP remover 1122, an FFT unit 1123, and an equalizer 1124. The wireless receiver 1121, the CP remover 1122, and the FFT unit 1123 of the receiving part 112 perform reverse functions of the wireless transmitter 1115, the CP inserter 1114, and the IFFT unit 1113 of the transmitting part 111. The receiving part 112 may further include a demodulator.

In addition to the illustrated block, the transceiver of FIG. 21 may include a receiver window controller (not shown) for extracting a portion of a received signal, and a decoding operation processing unit for performing a decoding operation on the signal extracted through the receiver window (not shown).

What is claimed is:

1. A method for a receiving user equipment (UE) that receives a signal through a sidelink, the method comprising:
   acquiring, by the receiving UE, synchronization for the sidelink;
   receiving, by the receiving UE, a first wireless signal and a second wireless signal through the sidelink, wherein the first wireless signal comprises a first cyclic prefix (CP) and the second wireless signal comprises a second CP;
   setting, by the receiving UE, a plurality of receiver windows to decode the first wireless signal and the second wireless signal, wherein start times of the plurality of receiver windows are set to be different; and
   performing, by the receiving UE, decoding on the first wireless signal and the second wireless signal based on the plurality of receiver windows.

2. The method of claim 1, wherein the plurality of receiver windows comprise a first receiver window and a second receiver window, and the receiving UE performs decoding on the first wireless signal and the second wireless signal based on the first receiver window and performs decoding on the first wireless signal and the second wireless signal based on the second receiver window.

3. The method of claim 1, wherein the plurality of receiver windows comprise a first receiver window and a second receiver window, and a difference between a start time of the first receiver window and a start time of the second receiver window is determined based on a smaller one among a length of the first CP and a length of the second CP.

4. The method of claim 1, wherein the first wireless signal is received through a low frequency band, the second wireless signal is received through a high frequency band, and a length of the first CP is set to be greater than a length of the second CP on a time domain.

5. The method of claim 1, wherein each of the plurality of receiver windows defines a time interval in which a fast Fourier transform (FFT) operation is performed on the first wireless signal and the second wireless signal.

6. The method of claim 1, wherein each of the plurality of receiver windows is commonly applied to the first wireless signal and the second wireless signal.

7. The method of claim 1, wherein control information for a start time of the plurality of receiver windows is acquired through the first wireless signal.

8. The method of claim 1, wherein the receiving UE is configured to communicate with at least one of a transmitting UE, a wireless communication server, and/or an autonomous vehicle.

9. A user equipment (UE) which receives a signal through a sidelink, the UE comprising:
   a transceiver configured to acquire a reception signal through the sidelink; and
   a processor connected to the transceiver and configured to control the transceiver,
   wherein the processor obtains synchronization for the sidelink by controlling the transceiver,
   wherein the processor receives a first wireless signal and a second wireless signal through the sidelink by controlling the transceiver, wherein the first wireless signal comprises a first cyclic prefix (CP) and the second wireless signal comprises a second CP;
   wherein the processor sets a plurality of receiver windows by controlling the transceiver to decode the first wireless signal and the second wireless signal, wherein start times of the plurality of receiver windows are set to be different; and wherein the processor performs decoding on the first wireless signal and the second wireless signal based on the plurality of receiver windows by controlling the transceiver.

10. The UE of claim 9, wherein the plurality of receiver windows comprise a first receiver window and a second receiver window, and the receiving UE performs decoding on the first wireless signal and the second wireless signal based on the first receiver window and performs decoding on the first wireless signal and the second wireless signal based on the second receiver window.

11. The UE of claim 9, wherein the plurality of receiver windows comprise a first receiver window and a second receiver window, and a difference between a start time of the first receiver window and a start time of the second receiver window is determined based on a smaller one among a length of the first CP and a length of the second CP.

12. The UE of claim 9, wherein the first wireless signal is received through a low frequency band, the second wireless signal is received through a high frequency band, and a length of the first CP is set to be greater than a length of the second CP on a time domain.

13. The UE of claim 9, wherein each of the plurality of receiver windows defines a time interval in which a fast Fourier transform (FFT) operation is performed on the first wireless signal and the second wireless signal.

14. The UE of claim 9, wherein each of the plurality of receiver windows is commonly applied to the first wireless signal and the second wireless signal.

15. The UE of claim 9, wherein control information for a start time of the plurality of receiver windows is acquired through the first wireless signal.

16. The UE of claim 9, wherein the transceiver is further configured to communicate with at least one of a transmitting UE, a wireless communication server, and/or an autonomous vehicle.

* * * * *